(12) United States Patent
Liu et al.

(10) Patent No.: US 11,740,163 B2
(45) Date of Patent: Aug. 29, 2023

(54) NANOMETER SIZE CHEMICAL MODIFIED MATERIALS AND USES

(71) Applicant: DIONEX CORPORATION, Sunnyvale, CA (US)

(72) Inventors: Xiaodong Liu, Cupertino, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 16/160,925

(22) Filed: Oct. 15, 2018

(65) Prior Publication Data

US 2019/0049352 A1   Feb. 14, 2019

Related U.S. Application Data

(60) Continuation of application No. 15/006,441, filed on Jan. 26, 2016, now abandoned, which is a division of application No. 13/396,263, filed on Feb. 14, 2012, now abandoned.

(60) Provisional application No. 61/442,752, filed on Feb. 14, 2011.

(51) Int. Cl.
| | |
|---|---|
| *B01J 20/286* | (2006.01) |
| *B01J 20/287* | (2006.01) |
| *B01J 20/289* | (2006.01) |
| *B01J 20/32* | (2006.01) |
| *G01N 1/40* | (2006.01) |
| *C07F 7/21* | (2006.01) |

(52) U.S. Cl.
CPC ............ *G01N 1/405* (2013.01); *B01J 20/286* (2013.01); *B01J 20/287* (2013.01); *B01J 20/289* (2013.01); *B01J 20/3219* (2013.01); *B01J 20/3246* (2013.01); *B01J 20/3257* (2013.01); *C07F 7/21* (2013.01); *B01J 2220/54* (2013.01)

(58) Field of Classification Search
None
See application file for complete search history.

(56) References Cited

U.S. PATENT DOCUMENTS

| | | | |
|---|---|---|---|
| 4,017,528 | A | 4/1977 | Unger et al. |
| 4,351,909 | A | 9/1982 | Stevens |
| 4,382,124 | A | 5/1983 | Meitzner et al. |
| 4,383,047 | A | 5/1983 | Stevens et al. |

(Continued)

FOREIGN PATENT DOCUMENTS

| | | |
|---|---|---|
| CN | 101274272 A | 10/2008 |
| EP | 0348705 A2 | 1/1990 |

(Continued)

OTHER PUBLICATIONS

CN201510728268.1 Office Action, dated Mar. 19, 2018, English translation, 10 pgs.

(Continued)

*Primary Examiner* — Kara M Peo

(57) ABSTRACT

A method of separating analytes in a liquid sample includes flowing the liquid sample through a chromatography column configured for use in liquid chromatography. The chromatography column contains a composition that includes a solid support having an exterior surface, a ligand, and a linker. The ligand includes a polyhedral oligomeric silsesquioxane moiety. The linker is covalently bound to both the polyhedral oligomeric silsesquioxane moiety and the exterior surface of the solid support.

20 Claims, 33 Drawing Sheets

Formula I

(56) References Cited

U.S. PATENT DOCUMENTS

| | | | |
|---|---|---|---|
| 4,519,905 | A | 5/1985 | Stevens et al. |
| 4,927,539 | A | 5/1990 | Stevens et al. |
| 5,130,343 | A | 7/1992 | Frechet et al. |
| 5,260,094 | A | 11/1993 | Giannelis et al. |
| 5,334,310 | A | 8/1994 | Frechet et al. |
| 5,453,185 | A | 9/1995 | Frechet et al. |
| 5,532,279 | A | 7/1996 | Barretto et al. |
| 5,728,457 | A | 3/1998 | Frechet et al. |
| 5,865,994 | A | 2/1999 | Riviello et al. |
| 5,925,253 | A | 7/1999 | Pohl et al. |
| 5,929,214 | A | 7/1999 | Peters et al. |
| 5,936,003 | A | 8/1999 | Pohl et al. |
| 5,968,363 | A | 10/1999 | Riviello et al. |
| 6,248,798 | B1 | 6/2001 | Slingsby et al. |
| 6,528,167 | B2 | 3/2003 | O'Gara |
| 6,686,035 | B2 | 2/2004 | Jiang et al. |
| 6,887,384 | B1 | 5/2005 | Frechet et al. |
| 7,074,331 | B2 | 7/2006 | Allington et al. |
| 7,303,671 | B2 | 12/2007 | Srinivasan et al. |
| 7,557,232 | B2 | 7/2009 | Liu et al. |
| 2004/0035290 | A1 | 2/2004 | Sammons et al. |
| 2006/0054559 | A1 | 3/2006 | Liu et al. |
| 2006/0070937 | A1 | 4/2006 | Rustamov et al. |
| 2006/0076296 | A1 | 4/2006 | Chen |
| 2008/0193734 | A1 | 8/2008 | Whitnall et al. |
| 2009/0012317 | A1 | 1/2009 | Laine et al. |
| 2009/0043042 | A1 | 2/2009 | Lippa et al. |
| 2012/0205315 | A1 | 8/2012 | Liu et al. |

FOREIGN PATENT DOCUMENTS

| | | |
|---|---|---|
| EP | 1529804 A1 | 5/2005 |
| JP | H04269656 A | 9/1992 |
| JP | 2010533124 A | 10/2010 |
| JP | 2011518916 A | 6/2011 |
| WO | WO 03/022433 A2 | 3/2003 |
| WO | WO 2005/047886 A1 | 5/2005 |
| WO | WO 2006/031717 A1 | 3/2006 |
| WO | WO 2006/086789 A2 | 8/2006 |
| WO | WO 2006/088760 A1 | 8/2006 |
| WO | WO 2007/074494 A1 | 7/2007 |

OTHER PUBLICATIONS

Gushikem et al., "Synthesis and applications of functionalized silsesquioxane polymers attached to organic and inorganic matrices," Pure Appl. Chem., vol. 80, No. 7, pp. 1593-1611, 2008 (DRAFT).

Qian, Xiaohong, et al., "Application of Modern Instrument Analysis in Biomedical Research," Chemical Industry Press, Sep. 30, 2003, pp. 38-41.

Yu, Shilin, "High Performance Liquid Chromatography and its Application," Chemical Industry Press, Feb. 29, 2000, pp. 72-81.

Chen, et al. Multiwalled carbon nanotubes grafted with polyhedral oligomeric silsesquioxane and its dispersion in poly(L-lactide) matrix, *Polymer* 49(4):943-951 (2008).

Cordes et al. Recent developments in the chemistry of cubic polyhedral oligosilsesquioxanes, *Chem. Rev.*110:2081-2173 (2010).

Ikada et al. Reaction of poly(vinyl alcohol) with potassium persulfate and graft copolymerization, *Journal of Polymer Science* 12:1829-1839 (1974).

Minakuchi, H., K, Nakanishi, N. Soga, N. Ishizuka, N. Tanaka. Effect of domain size on the performance of octadecylsilylated continuous porous silica columns in reversed-phase liquid chromatography, *J. Chromatog. A.* 797:121-131 (1998).

Minakuchi, H., K. Nakanishi, N. Soga, N. Ishizuka, N. Tanaka, Octadecylsilylated porous silica rods as separation media for reversed-phase liquid chromatography, *Anal Chem.* 68:3498-3501 (1996).

Wu et al. Polyhedral oligomeric silsesquioxane as a cross-linker for preparation of inorganic-organic hybrid monolithic columns, *Analytical Chemistry* 82(13):5447-5454 (2010).

Xie, K. et al. Adsorption properties of nano-cellulose hybrid containing polyhedral oligomeric silsesquioxane and removal of reactive dyes from aqueous solution, *Carbohydrate Polymers* 83(4):1516-1520 (2011).

Xie, K. et al. Preparation and characterization of cellulose hybrids grafted with the polyhedral oligomeric silsequioxsnes (POSS), *Carbohydrate Polymers* 77(4):858-862 (2009).

Duan et al., "Surface Modification and Reinforcement of Silica Aerogels using Polyhedral Oligomeric Silsesquioxanes," Langmuir, 2012, 28(43), 15362-15371.

Gruen et al., "The Synthesis of Micrometer- and Submicrometer-Size Spheres of Ordered Mesoporous Oxide MCM-31," Advanced Materials, 9, 254, 1997.

Kanamori et al., "New Transparent Methylsilsesquioxane Aerogels and Xerogels with Improved Mechanical Properties," Adv. Mater., 2007, 19, 1589-1593.

Kirkland et al., "High pH mobile phase effects on silica-based reversed-phase high-performance liquid chromatographic columns," J. of Chromatography A, 691, 3-19, 1995.

Luca, "Frameworks Based on Polyhedral Oligomeric Silsesquioxanes," Thesis, The Scripps Institute, 22 pages, 2008.

Ye et al., "A systematic stability evaluation of analytical RP-HPLC columns," J. of Pharmaceutical and Biomedical Analysis, 50, 426-431, 2009.

Zhao et al., "Preparation of Ordered Mesoporous Silica from Polyhedral Oligomeric Silsesquioxane," Chinese J. of Inorganic Chem., 23(3), 545-549, 2007 (English abstract on first page).

Formula I

FIG. 3  Formula II

Formula IV

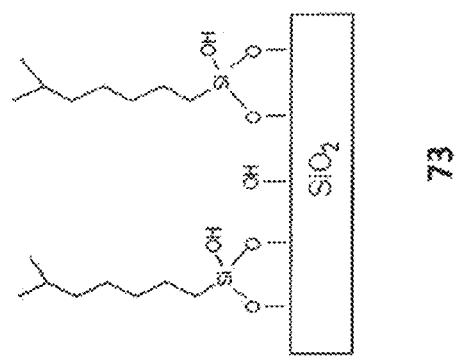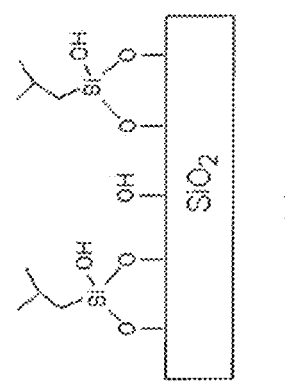
FIG. 24

NANOMETER SIZE CHEMICAL MODIFIED MATERIALS AND USES

CROSS REFERENCE TO RELATED APPLICATIONS

This application is a continuation under 35 U.S.C. § 120 and claims the priority benefit of co-pending U.S. Non-Provisional application Ser. No. 15/006,441, filed on Jan. 26, 2016 which is a Divisional of U.S. Non-Provisional application Ser. No. 13/396,263, filed on Feb. 14, 2012, entitled "NANOMETER SIZE CHEMICAL MODIFIED MATERIALS AND USES," which claims the priority benefit to U.S. Provisional Application No. 61/442,752 filed on Feb. 14, 2011, the entire disclosure of which is incorporated by reference.

BACKGROUND OF THE INVENTION

For liquid chromatography applications, selectivity and hydrolytic stability of the stationary phase are the most important aspects. Silylating reagents have been widely used for modifying solid supports, including silica gel, for liquid chromatography and many other applications. While silylating reagents with diverse functional groups are commercially available, making stationary phases with high surface coverage and high hydrolytic stability remains challenging.

Polyhedral oligomeric silsequioxanes (POSS) are a class of nanometer size compounds with high symmetry, good chemical and thermal stability, and ready commercial availability. They find use as nanometer-scale building blocks to improve the properties of a broad range of materials including medical polymers, high-temperature composites, dendrimers, liquid crystals, coatings, etc. POSS are crystalline solids based on six-, eight-, and ten-member rings in a three dimensional structure. The most commonly observed form is the T8 cubical polyhedral octamer with the formula of $(RSiO_{3/2})_8$, which consists of a siloxane cubic cage with eight pendant arms from corners of the cube in a three dimensional arrangement. In addition to complete POSS, such as T8, incompletely formed intermediate POSS compounds have also been developed. For example, incomplete T7 POSS compounds with three adjacent silanols oriented have been covalently attached to various substrates. For a general review, see, Cordes et al., Recent Developments in the Chemistry of Cubic Polyhedral Oligosilsesquioxanes, *Chem. Rev.* 2010, 110, 2081-2173.

Although POSS compounds are well-characterized and widely used, they remain virtually unexploited in the field of separations. One report describes the use of a POSS cross-linker used in an inorganic-organic hybrid monolithic column, however, these workers do not describe the use of a POSS grafted to a solid support as a stationary phase for chromatography. Polyhedral Oligomeric Silsesquioxane as a Cross-linker for Preparation of Inorganic-Organic Hybrid Monolithic Columns. Wu, et al., *Analytical Chemistry* (2010), 82(13), 5447-5454.

The use of POSS compounds as stationary phase surface modifiers for chromatography applications, e.g., liquid chromatography (LC), gas chromatography (GC) and sample preparation consumables would provide access to novel materials with a range of properties. The present invention provides nanometer size POSS compounds of use as surface modifying agents to make stationary phases for chromatography applications, including liquid chromatography (LC), gas chromatography (GC) and sample preparation consumables.

BRIEF SUMMARY OF THE INVENTION

POSS-containing stationary phase materials for chromatography exhibit several benefits compared to those prepared by conventional methods using silylating reagents, e.g., improved hydrolytic stability, increased hydrophobicity, high ligand coverage and unique selectivity (increased shape selectivity, increase hydrophobic selectivity). In addition, the commercial availability of a range of useful POSS compounds at economical costs makes them a viable approach for developing novel stationary phases. However, until the present inventions, POSS-based materials were not used as surface modifying agents for stationary supports for chromatography.

In various embodiments, the present invention provides new materials having a surface covalently modified with a polyhedral oligosilsesquioxane (POSS). The POSS can be grafted directly to the solid support or it can be indirectly grafted to the solid support through a linker covalently bound to both the solid support and the POSS. In exemplary embodiments, the invention also provides methods for preparing and using these new materials. Exemplary materials of the invention find use in chromatography (e.g., liquid, gas) and in extractions (e.g., solid phase extraction).

POSS compounds are symmetrical, nanometer size building blocks. They can be used to create different surface morphologies and unique properties on the substrate surface compared to conventional silane coupling agents. As a result, POSS bonded phases are of use to design and manufacture stationary phases providing unique chromatographic selectivity. Compared to silane coupling agents, POSS compounds are more economical and safer precursors for surface modification because of their non-volatile nature and low toxicity. Many POSS compounds with a variety of functionalities are commercially available.

A particular advantage provided by POSS is that a single molecule can provide up to five times the surface coverage relative to that provided by comparable silane coupling agents applied in the hypothetical monolayer fashion where R=cyclohexyl. Thus, POSS bonded phases have high ligand density, which leads to better hydrolytic stability and higher hydrophobic retention than similar stationary phases prepared by silylation.

Other embodiments, objects and advantages of the invention are apparent from the detailed description that follows.

BRIEF DESCRIPTION OF THE DRAWINGS

FIG. 24 shows the structures of iso-butyl trifunctional phase (72) and iso-octyl trifunctional phase (73) prepared by conventional silane reactions.

DETAILED DESCRIPTION OF THE INVENTION

I. Introduction

Figure 1:
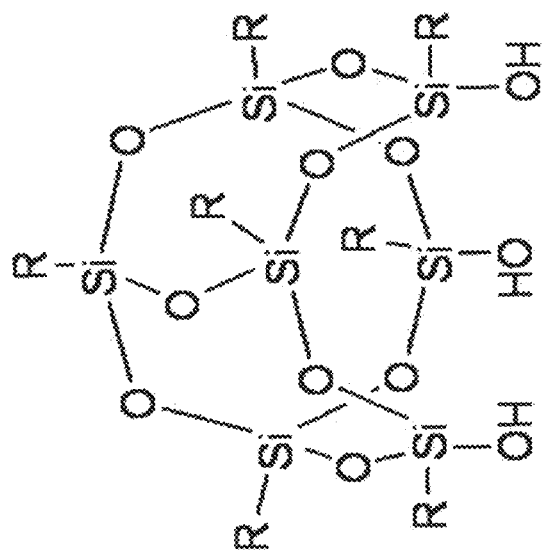
FIG. 1 shows a general structure of $T_7R_7(OH)_3$-POSS (Formula I).

As set forth above, the inventors have recognized that the POSS-modified solid supports (e.g., stationary phases for chromatography and solid phases for extraction) provide access to materials with unique properties and allow for the engineering of characteristics such as the size and shape selectivity of these materials for analytes, and the stability of the materials. Exemplary stationary phases are $T_7$-POSS stationary phases, formed by reaction between a solid support and a $T_7R_7(OH)_3$-POSS species. In this case, three silanol groups in each POSS molecule are oriented in such as way that three Si—O—Si linkages can form between the POSS and the silica surface, resulting in stable bonding. In addition, due to the availability of seven R groups in each POSS molecule, the ligand density is higher with POSS relative to the ligand density in comparable silane coupling agents applied in the hypothetical monolayer fashion. Last but not least, the nanometer sized and symmetrical POSS molecules create unique surface morphology on the substrate surface, which leads to novel chromatography properties.

Other POSS bonded phases that possess similar functionalities, such as $T_6R_5X$-POSS, $T_{10}R_9X$-POSS, $T_{12}R_{11}X$-POSS, $T_8R_7X$-POSS, $T_8R_8(OH)_2$-POSS, $T_8R_8(OH)_4$-POSS, or $T_4R_4(OH)_4$-POSS, and methods of making and using these stationary phases are also provided by this invention. In exemplary embodiments X is a reactive functional group and is selected from H; alkyl or aryl amine; alkyl or aryl halide; alkyl or aryl alcohol; alkyl or aryl carboxylic acid; alkyl or aryl acyl chloride; alkyl or aryl sulfonyl chloride; alkyl or aryl anhydride; alkyl or aryl isocyanate; alkyl or aryl imide; alkyl or aryl thiol; alkyl or aryl epoxide; olefin-containing moiety; silicon-containing moiety; silanol; or a polymerizable moiety.

The benefits of the stationary phases provided by this invention include without limitation: (1) the compositions provide unique selectivity. For example, the compositions can be used to retain and separate analytes using reverse phase and POSS moieties within the same analysis; (2) the selectivity of the current compositions can be adjusted by changing the chemical composition of the POSS moiety or the linker; (3) the compositions are compatible with highly aqueous conditions (e.g., resistant to hydrolysis); (4) the compositions are useful not only for making analytical separation columns, but also for developing new solid phases extraction (SPE) applications; (5) the compositions can be blended with other chromatographic packing materials to produce a variety of novel packing materials for both separation and SPE columns; (6) the compositions can be prepared in a versatile, facile and economic manner; (7) the amount of ligand, its linker length and composition and the identity of the POSS moiety are readily adjusted by using standard solid supports with different surface area and particle size, different ligand structures, and/or different surface chemistry to form the layer on the solid support.

II. Definitions

Where substituent groups with unfilled valency are specified by their conventional chemical formulae, written from left to right, they optionally equally encompass the chemically identical substituents, which would result from writing the structure from right to left, e.g., —$CH_2$O— is intended to also optionally recite —O$CH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e., $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl". Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —$CH_2CH_2CH_2$— (propylene or propane-1,3-diyl), and further includes those groups described below as "heteroalkylene". Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by $CH_3CH_2CH_2$═ (propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH═CH—O—$CH_3$, —Si($CH_3$)$_3$, —$CH_2$—CH═N—O$CH_3$, and —CH═CH—N($CH_3$)—$CH_3$. Up to two heteroatoms may be consecutive, such as, for example, —$CH_2$—NH—O$CH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Optionally, for alkylene and heteroalkylene linking groups, no orientation of the linking group is implied by the direction in which the formula of the linking group is written. For example, the formula —$CO_2$R'— optionally represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —OS(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). Exemplary alkyl group substituents include those groups referred to herein as "reactive functional groups" and "linkage fragments."

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"' are preferably independently selected from hydrogen or substituted or unsubstituted (C$_1$-C$_6$)alkyl. Exemplary alkyl group substituents include those groups referred to herein as "reactive functional groups" and "linkage fragments."

A "linkage fragment," is a moiety that joins two components of a linker (e.g., L1 and L2, FIG. 8) or the POSS to the linker, or the linker to the substrate, and generally refers to a covalent bond that is formed by reaction of reaction partners, each of which has a reactive functional group of reactivity complementary to the reactivity of its partner. Linkage fragments joining any two components are independently selected. Exemplary linkage fragments include, but are not limited to S, NRR'+, RNC(O)NR', OCH(OH) CH2NH, SC(O)NH, HNC(O)S, SC(O)O, O, NR, NHC(O), (O)CNH, NHC(O)O, OC(O)NH, (CH2)aSiOu (a is 0 or 1; u is 0, 1, 2 or 3), CH2S, CH2O, CH2CH2O, CH2CH2S, (CH2)oO, (CH2)oS or (CH2)oYx PEG wherein Yx is S, NH, NHC(O), C(O)NH, NHC(O)O, OC(O)NH, or O and o is an integer from 1 to 50. R is as defined hereinbelow.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"R'", —OC(O)R', —C(O)R', —CO₂R', —CONR'R", —OC(O)NR'R", —NR"C(O)R', —NR'—C(O)NR"R'", —NR"C(O)₂R', —NR—C(NR'R"R'")=NR"", —NR—C(NR'R")=NR'", —S(O)R', —S(O)₂R', —OS(O)₂R', —S(O)₂NR'R", —NRSO₂R', —CN and —NO₂. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF₃ and —CH₂CF₃) and acyl (e.g., —C(O)CH₃, —C(O)CF₃, —C(O)CH₂OCH₃, and the like).

As used herein, the term "non-reactive silyl group substituent" means a "silyl group substituent" that does not react with a substrate of the invention to form a covalent bond between the silyl group substituent and the substrate. Exemplary "non-reactive silyl group substituents" include alkyl (e.g., methyl, ethyl, propyl, butyl and other lower alkyl groups) or aryl groups (e.g., phenyl).

As used herein, the term "reactive silyl group substituent" means a "silyl group substituent" that is capable of reacting with a substrate of the invention (or a linker grafted to a substrate) to form a covalent bond between the silyl group substituent and the substrate (or linker). Exemplary "reactive silyl group substituents" include those groups that are conventionally defined as leaving groups, such as halogens (e.g., Cl and Br). Other exemplary "reactive silyl group substituents" include alkoxy groups (e.g., methoxy or ethoxy) and primary and secondary amino groups.

As used herein, "POSS" refers to any POSS containing functionality that can react with the functional group on the substrate or linker moiety.

Figure 2:
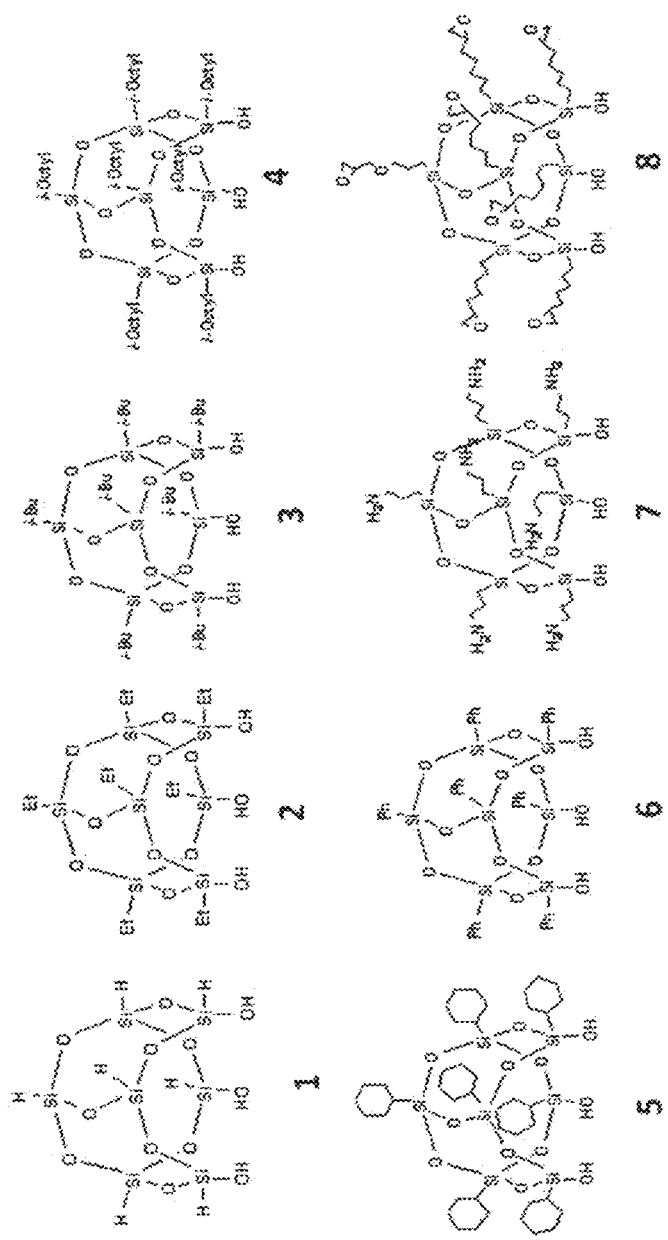
FIG. 2 shows examples of $T_7R_7(OH)_3$-POSS.

An exemplary POSS is $T_7R_7(OH)_3$-POSS. This type of POSS compounds are mainly used for functionalizing any surface that has free silanol groups, such as silica gel, organo-silica gel, and the like. The general structure and some examples are illustrated in FIG. 1 and FIG. 2.

Figure 3:
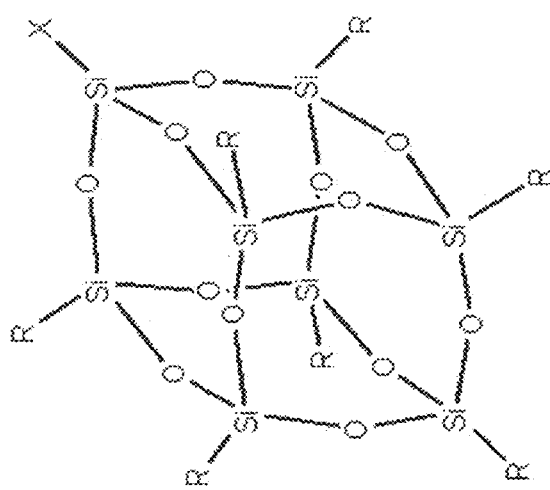
FIG. 3 shows a general structure of $T_8R_7X$-POSS (Formula II).
Figure 4:
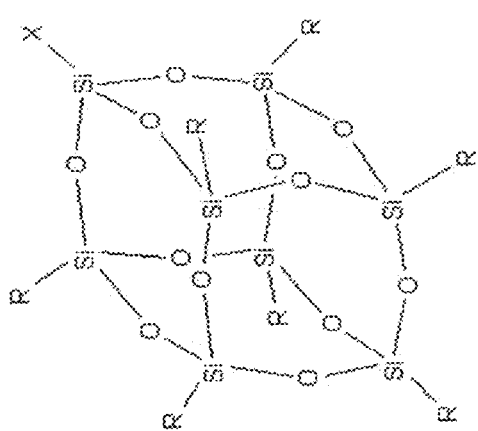
FIG. 4 shows examples of $T_8R_7X$-POSS.

POSS, such as $T_8R_7X$-POSS having reactive functional groups (e.g., X) are able to couple with the reactive functional groups on the substrate surface (or linker) to form stable linkages. In exemplary embodiments, the substrate is silica gel, organo-silica gel, polymer resins, and the like. A general structure and some examples are illustrated in FIG. 3 and FIG. 4.

Further exemplary POSS compounds possessing similar functionalities, include $T_6R_5X$-POSS, $T_{10}R_9X$-POSS, $T_{12}R_{11}X$-POSS, $T_8R_8(OH)_2$-POSS, $T_8R_8(OH)_4$-POSS, or $T_4R_4(OH)_4$-POSS, etc.

As used herein, "POSS Bonded Phase" is the reaction product of a substrate (or substrate-linker composition) and a POSS.

Figure 6:
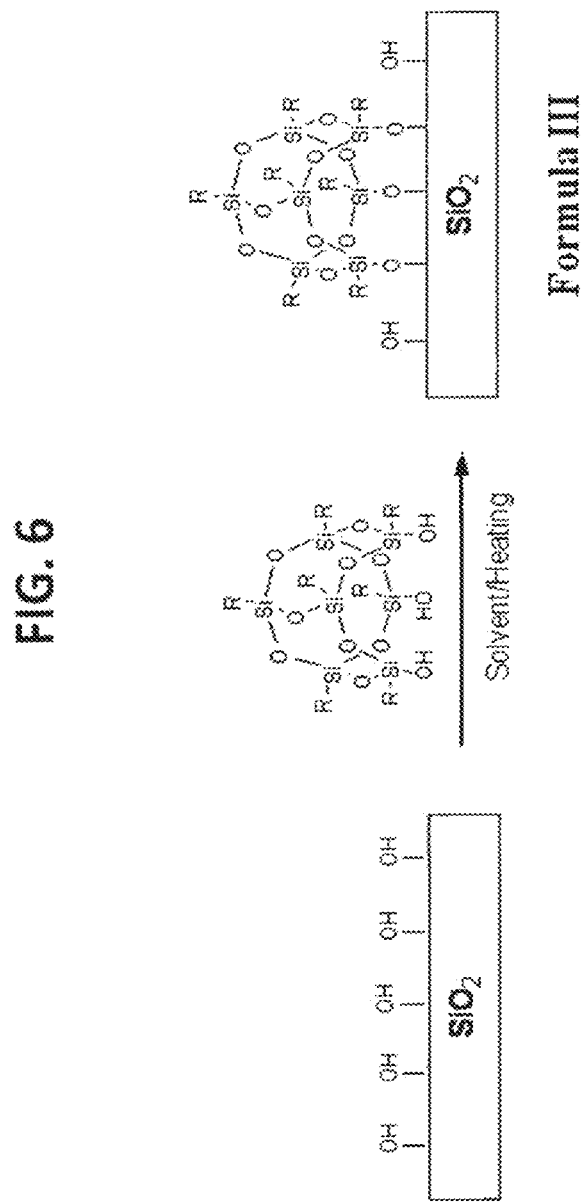
FIG. 6 shows the general synthetic route for $T_7$-POSS bonded phases (Formula III).
Figure 7:
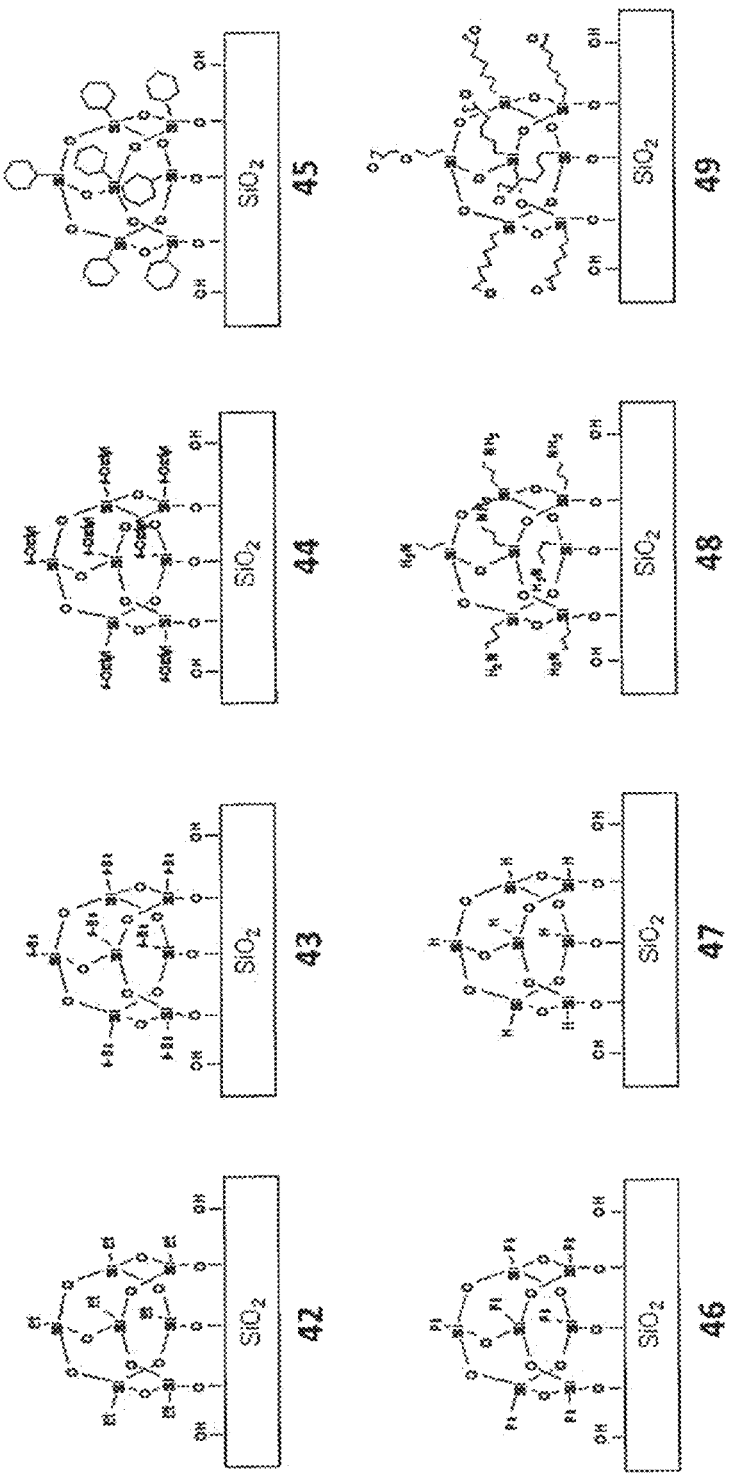
FIG. 7 shows examples of $T_7$-POSS bonded phases.

An exemplary POSS Bonded Phase, the $T_7$-POSS bonded phase, is the product of a $T_7R_7(OH)_3$-POSS compound reacting with a substrate having an exterior surface with free silanol groups, such as silica gel or organo-silica gel, through Si—O—Si linkages. The general structure and reaction of this type of POSS Bonded Phases are illustrated in FIG. 6, and some examples based on silica substrate are illustrated in FIG. 7.

Figure 8:
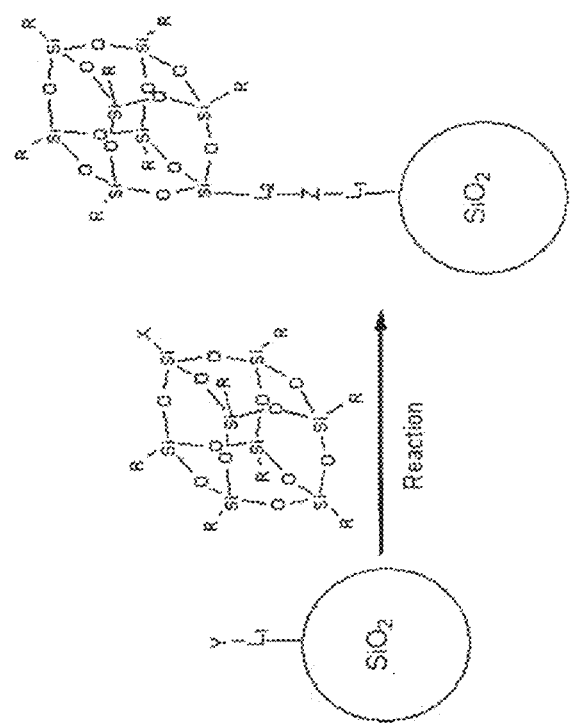
FIG. 8 shows the general synthetic route for $T_8$-POSS bonded phases (Formula IV).

The $T_8$-POSS bonded phase is the product of a $T_8R_7X$-POSS that have reactive functional groups to couple with the reactive functional groups on the Substrate surface to form stable linkages. The general structure and reaction of this type of POSS Bonded Phases are illustrated in FIG. 8, and some examples based on silica substrate are illustrated in FIGS. 9-23.

As used herein, the term "acyl" describes a substituent containing a carbonyl residue, C(O)R. Exemplary species for R include H, halogen, substituted or unsubstituted alkyl, substituted or unsubstituted hetroalkyl, substituted or unsubstituted aryl, substituted or unsubstituted heteroaryl, and substituted or unsubstituted heterocycloalkyl.

The symbol "R" (including R', R", R'", etc.) is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), silicon (Si) and boron (B).

As used herein, the term "linker" describes a moiety interposed between the POSS moiety and the substrate. An exemplary linker has the formula $L^1$-X-$L^2$ in which $L^1$ and $L^2$ are members selected from substituted or unsubstituted alkyl, substituted or unsubstituted heteroalkyl, substituted or unsubstituted aryl and substituted or unsubstituted heteroaryl moieties linked through covalent bonding through X, which is a linkage fragment.

The linker optionally includes internal ionic, ionizable or polar groups, e.g., an ion exchange group. Exemplary polar, ionic and ionizable groups are described herein. Exemplary polar groups include ether groups, amide groups, sulfonamide groups, urea groups, carbamate groups, carbonate groups and the like. An exemplary linker moiety includes a carbon chain having a number of carbon atoms in sequence, wherein this number is defined by a lower and/or an upper limit. With respect to the lower limit an exemplary linker has at least 6, at least 7, at least 8, at least 9, at least 10, at least 11, at least 12, at least 13, at least 14, at least 15, at least 16, at least 17, at least 18, at least 19, or at least 20 carbon atoms in sequence. With respect to the higher limit, the linker moiety includes preferably not more than about 50 carbon atoms in sequence, not more than about 30 carbon atoms, not more than about 25 carbon atoms, not more than about 20 carbon atoms, not more than about 15 carbon atoms, not more than about 14, not more than about 13, not more than about 12, not more than about 11, not more than about 10, not more than about 9 or not more than about 8 carbon atoms in sequence. Exemplary ranges for the number of carbon atoms in sequence may be formed between any of the above described higher and lower limits. In a particular embodiment, a hydrophobic moiety has at least 8 carbon atoms in sequence. In another embodiment, the linker moiety has at least 8 carbon atoms, but not more than 20 carbon atoms in sequence. Within the linker moiety, at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted, e.g., with a non-polar (hydrophobic) substituent, such as an unsubstituted alkyl group (e.g., methyl, ethyl or propyl group). In one example, the linker moiety exhibits reversed phase characteristics (e.g., at least $C_8$ alkyl).

As used herein, exemplary "reactive functional groups" of use in the present invention include, but are not limited to olefins, acetylenes, alcohols, phenols, ethers, oxides, halides, aldehydes, ketones, carboxylic acids, esters, amides, cyanates, isocyanates, thiocyanates, isothiocyanates, amines, hydrazines, hydrazones, hydrazides, diazo, diazonium, nitro, nitriles, mercaptans, sulfides, disulfides, sulfoxides, sulfones, sulfonic acids, sulfinic acids, acetals, ketals, anhydrides, sulfates, sulfenic acids isonitriles, amidines, imides, imidates, nitrones, hydroxylamines, oximes, hydroxamic acids thiohydroxamic acids, allenes, ortho esters, sulfites, enamines, ynamines, ureas, pseudoureas, semicarbazides, carbodiimides, carbamates, imines, azides, azo compounds, azoxy compounds, and nitroso compounds. Reactive functional groups also include those used to prepare bioconjugates, e.g., N-hydroxysuccinimide esters, maleimides and the like. Methods to prepare each of these functional groups are well known in the art and their application to or modification for a particular purpose is within the ability of one of skill in the art (see, for example, Sandler and Karo, eds. ORGANIC FUNCTIONAL GROUP PREPARATIONS, Academic Press, San Diego, 1989).

Useful reactive functional group conversions include, for example:

(a) carboxyl groups which are readily converted to various derivatives including, but not limited to, active esters (e.g., N-hydroxysuccinimide esters, N-hydroxybenztriazole esters, thioesters, p-nitrophenyl esters), acid halides, acyl imidazoles, alkyl, alkenyl, alkynyl and aromatic esters;

(b) hydroxyl groups, which can be converted to esters, ethers, halides, aldehydes, etc.

(c) haloalkyl groups, wherein the halide can be later displaced with a nucleophilic group such as, for example, an amine, a carboxylate anion, thiol anion, carbanion, or an alkoxide ion, thereby resulting in the covalent attachment of a new group at the site of the halogen atom;

(d) dienophile groups, which are capable of participating in Diels-Alder reactions such as, for example, maleimido groups;

(e) aldehyde or ketone groups, such that subsequent derivatization is possible via formation of carbonyl derivatives such as, for example, imines, hydrazones, semicarbazones or oximes, or via such mechanisms as Grignard addition or alkyllithium addition;

(f) sulfonyl halide groups for subsequent reaction with amines, for example, to form sulfonamides;

(g) thiol groups, which can be, for example, converted to disulfides or reacted with acyl halides;

(h) amine or sulfhydryl groups, which can be, for example, acylated, alkylated or oxidized;

(i) alkenes, which can undergo, for example, cycloadditions, acylation, Michael addition, etc;

(j) epoxides, which can react with, for example, amines and hydroxyl compounds; and (k) phosphoramidites and other standard functional groups useful in nucleic acid synthesis.

The reactive functional groups can be chosen such that they do not participate in, or interfere with, the reactions necessary to assemble the oligomer of the invention. Alternatively, a reactive functional group can be protected from participating in the reaction by the presence of a protecting group. Those of skill in the art understand how to protect a particular functional group such that it does not interfere with a chosen set of reaction conditions. For examples of useful protecting groups, see, for example, Greene et al., PROTECTIVE GROUPS IN ORGANIC SYNTHESIS, John Wiley & Sons, New York, 1991.

As used herein, the term "ion-exchange group" refers to an ionic group or an ionizable group. Ionic groups are charged (e.g., positively charged quaternary amine), while ionizable groups can be charged or non-charged depending on the conditions to which the ionizable group is exposed (i.e., basic or acidic groups). For example, a tertiary amino group can be charged by accepting a proton (basic group) while a carboxylic acid group can be charged by donating a proton (acidic group). Ion-exchange groups include anion-exchange groups, cation-exchange groups, amphoteric and zwitterionic groups. Anion-exchange groups include primary, secondary, tertiary and quaternary amines, as well as any other basic (proton-accepting) functionalities. Cation-exchange groups include sulfonates, sulfates, carboxylates, phosphonates, phosphates, silanols, phenolic hydroxyl groups and any other acidic (proton-donating) functionalities. Amphoteric and zwitterionic ligands include at least one anion-exchange and at least one cation-exchange group, each of which can be selected from the above described ion-exchange groups. Exemplary stationary phases of the invention (e.g., the substrates, the ligands) are essentially free of ion-exchange groups, thereby avoiding a complex, multimodal separation mechanism.

As used herein, the terms "having a charge", "charged", "positively charged", "negatively charged" and any grammatical variation thereof, in connection with the stationary phases of the invention can mean incorporating "ionic" or "ionizable" groups.

The terms "substrate" and "support" or "solid support" are used interchangeably.

"Grafted", "Bound", and Immobilized" are used interchangeably to refer to the direct covalent attachment of a POSS moiety to a substrate or the indirect attachment of this moiety to the substrate through a linker covalently bound to both the POSS moiety and the substrate.

The term "essentially retained" refers to an analyte (e.g., an ion, an ionizable compound, an uncharged molecule and the like) and means that the analyte elutes from the separation medium after the void volume, e.g., giving rise to a peak with baseline separation from the solvent peak.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

As used herein, "substrate" refers to any material containing functionality that can react with a reactive functional group of the POSS moiety, a linker or a linker component, including but not limited to bare silica, organo-silica hybrid materials, core-shell structures of two materials, $ZrO_2$, $TiO_2$ and $Al_2O_3$, functionalized materials based on any of the four substrates exemplified above, such as surface modified halides, amines, isocyanates, anhydrides, epoxides, alcohols, hydrides, olefins, etc., polymer based materials that contain surface modified halides, amines, isocyanates, anhydrides, epoxides, alcohols, hydrides, olefins, etc.

Figure 5:
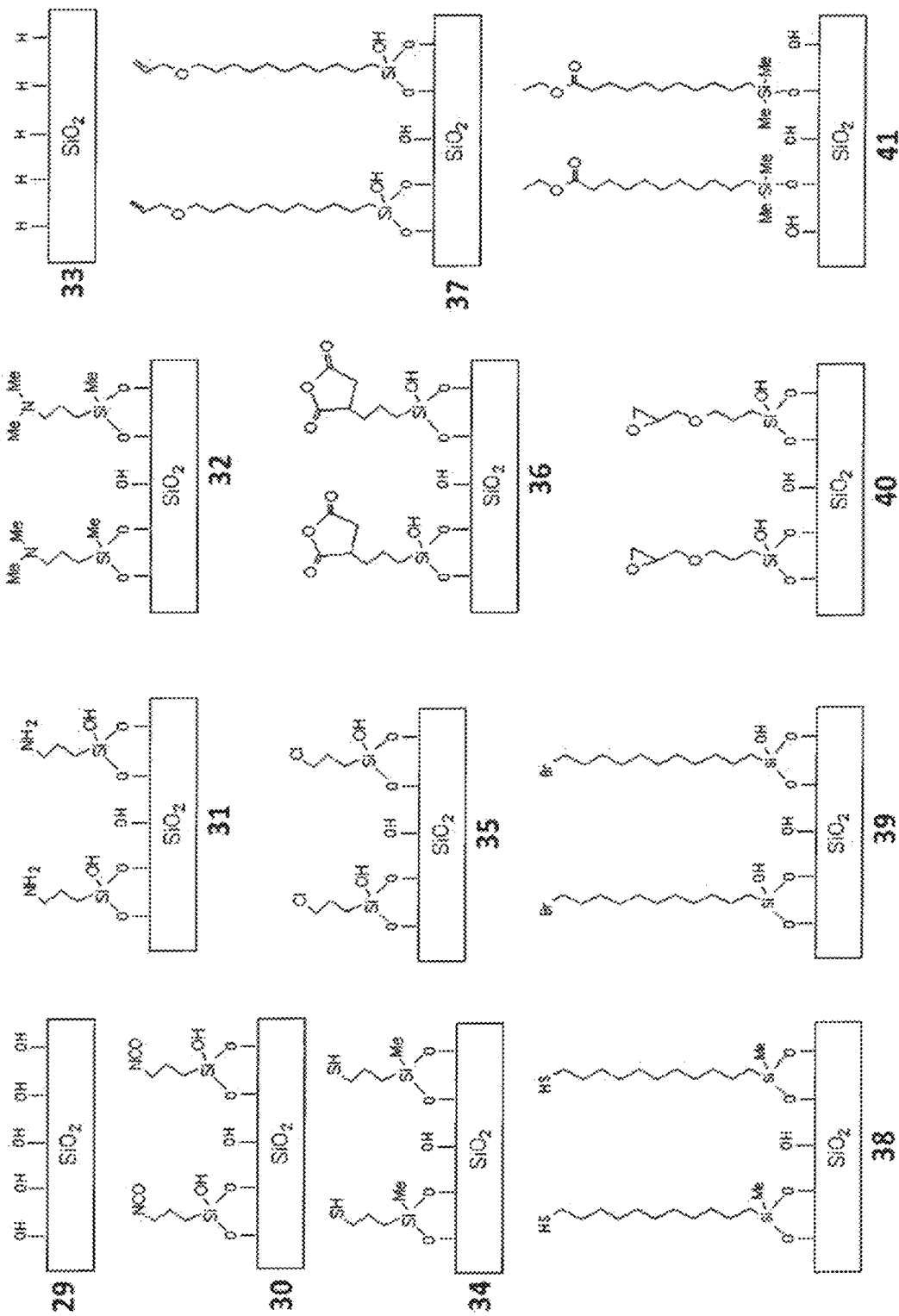
FIG. 5 shows examples of substrate materials.

Exemplary substrate morphology includes particulate or monolithic, porous or non-porous (for particulate), spherical or irregular (for particulate), particle size (for particulate): 0.5 to 100-μm, surface area: 0.5 to 800 m$^2$/g, pore size (for porous): 40 to 2000 Å. Some examples of silica based substrates bearing grafted linker components (29-41) are illustrated in FIG. 5.

Certain ligands and stationary phases of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The compounds of the present invention may also contain unnatural proportions of atomic isotopes at one or more of the atoms that constitute such compounds. For example, the compounds may be radiolabeled with radioactive isotopes, such as, for example, deuterium, tritium ($^3$H), iodine-125 ($^{125}$I) and carbon-14 ($^{14}$C). All isotopic variations of the compounds of the present invention, whether radioactive or not, are intended to be encompassed within the scope of the present invention.

III. Exemplary Embodiments

A. Compositions

The present invention provides a composition including: (a) a solid support; and (b) a ligand comprising a POSS moiety covalently bound to the solid support. The ligand is bound either directly to the solid support or is indirectly bound to the support through a linker covalently bound to both the POSS moiety and the solid support. In various examples, the ligands include a combination of a linker having a chromatographic property selected from reverse phase, ion exchange and a combination thereof in addition to the POSS moiety. In various embodiments, the POSS moiety is not a cross-linking component of the composition. In various embodiments, the POSS is grafted to the solid support through only a single locus (e.g., silicon atom, oxygen atom or linker). In various embodiments, a single solid support has two or more ligands of different structure grafted thereto. Thus, it is within the scope of the invention to vary the composition/structure of the POSS and/or the linker of the ligands on a single solid support. The versatility of the ligands of the invention allows the properties of the stationary phase to be engineered by varying one or more structural parameter of the POSS, the linker or both.

Exemplary solid supports, linkers and ligands useful in the compositions and methods of the invention are described herein.

(i). Solid Support

The solid support (substrate) of the current invention can be any solid material to which the ligands (or components thereof) can be grafted and can optionally include pores (e.g., those useful as a stationary phase/packing material for chromatography). In one example, the solid support includes inorganic (e.g., silica) material. In another example, the solid support includes organic (e.g., polymeric) material (e.g., synthetic resins). In yet another example, the solid support includes a hybrid inorganic-organic material. The substrate is preferably insoluble in the solvent system used for the respective separation.

In one embodiment, the solid support includes metal oxides or metalloid oxides. Exemplary substrates include silica-based (e.g., silicon oxide, $SiO_2$), titania-based (e.g., titanium oxide, $TiO_2$), germanium-based (e.g., germanium oxide), zirconia-based (e.g., zirconium oxide, $ZrO_2$), alumina-based (e.g., aluminum oxide, $Al_2O_3$) materials or mixtures thereof. Other substrates include cross-linked and non-crosslinked polymers, carbonized materials and metals. Substrates can also incorporate polymeric networks, sol-gel networks or hybrid forms thereof. In one embodiment, the substrate is a silica-based substrate. Exemplary silica-based substrates include silica gel, glass, sol-gels, polymer/sol-gel hybrids, core-shell structures and silica monolithic materials.

Exemplary synthetic resins useful as the organic substrate in the current invention are described in U.S. Pat. No. 4,927,539 to Stevens et al., U.S. Pat. No. 4,351,909 to Stevens et al., U.S. Pat. No. 4,519,905 to Stevens et al., U.S. Pat. Nos. 4,383,047 and 5,532,279 to Barretto et al., the disclosures of which are each incorporated herein by reference for all purposes.

The solid support may be formed from any synthetic resin material. Exemplary synthetic polymer ion-exchange resins include poly(phenol-formaldehyde), poly(acrylic acid), poly (methacrylic acid), polynitriles, amine-epichlorohydrin copolymers, graft polymers of styrene on polyethylene or polypropylene, poly (2-chloromethyl-1,3-butadiene), poly (vinylaromatic) resins such as those derived from styrene, alpha-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy)ethyl glycidyl ether) as well as those derived from vinylbenzyl chlorides, vinylbenzyl alcohols, 2-(4-vinylbenzyloxy)ethanol, polyacrylamides, polyvinylalcohols, polyvinylformamides.

Any of the above materials can optionally be co-polymerized with monomers incorporating ionic or ionizable (and optionally reverse-phase) functionalities. Any of the above materials can optionally be functionalized with a suitable ligand incorporating ionic or ionizable and optionally reverse-phase functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 0% to about 100% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science*, Vol. 12, 1829-1839 (1974) or as described in U.S. Pat. No. 4,382,124 to Meitzner, et al.

In various embodiments in which a polymer is utilized, the POSS does not serve as a cross-linker within the polymer.

In one example, the solid support includes a silica-, alumina-, zirconia- or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one example, the solid support of the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical; e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica micro-spheres) and about 10,000 µm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about 100 microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns. In a particular example, the substrate is silica-based (e.g., silica gel) having a median particle size of between about 40 and 80 microns. The particle size can also be measured in "mesh" as defined on the Tyler Equivalent scale (the smaller the particle, the higher the mesh number). Typical mesh characteristics range between about 10 and 600. Generally, substrate particles useful in any packed bed chromatographic application (e.g., LC, HPLC or ultra-pressure chromatography) are suitable for use in the compositions of the invention.

In various examples, the support is in particulate form, and multiple support particles are disposed in a packed bed. For example, a plastic or metal column is packed with the support particles.

In other examples, the substrate particles are essentially "monodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5× M and about 1.5×M.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331, the disclosures of which are incorporated herein by reference in their entireties for all purposes.

When a porous substrate is used, the pores of the substrate can be of any size. In a typical substrate, the average pore size is equal to or smaller than the micro-particles, described herein below. The nominal pore size is typically measured in angstroms ($10^{-10}$ m, Å). In one example, the average diameter of the substrate pores is between about 1 and about 5000 Å. In another example, the volume average diameter of the substrate pores is between about 10 and about 5000 Å, between about 10 and about 4000 Å, between about 10 and about 3000 Å, between about 10 and about 2000 Å, between about 10 and about 1000 Å, between about 10 and about 800 Å, between about 10 and about 600 Å, between about 10 and about 400 Å, between about 10 and about 200 Å, between about 10 and about 100 Å, between about 20 and about 200 Å, between about 20 and about 100 Å, between about 30 and about 200 Å, between about 30 and about 100 Å, between about 40 and about 200 Å, between about 40 and about 100 Å, between about 50 and about 200 Å, between about 50 and about 100 Å, between about 60 and about 200 Å, between about 60 and about 100 Å, between about 70 and about 200 Å, between about 70 and about 100 Å, between about 80 and about 200 Å, between about 100 and about 200 Å, between about 100 and about 300 Å, between about 100 and about 400 Å, between about 100 and about 500 Å, between about 200 and about 500 Å or between about 200 and about 600 Å.

The specific surface area of the substrate is typically between about 0.1 and about 2,000 m$^2$/g. For example, the specific surface area of the substrate is between about 1 and about 1,000 m$^2$/g, between about 1 and about 800 m$^2$/g, between about 1 and about 600 m$^2$/g, between about 1 and about 400 m$^2$/g, between about 1 and about 200 m$^2$/g or between about 1 and about 100 m$^2$/g of resin. In another example, the specific surface area of the substrate is between about 3 and about 1,000 m$^2$/g, between about 3 and about 800 m$^2$/g, between about 3 and about 600 m$^2$/g, between about 3 and about 400 m$^2$/g, between about 3 and about 200 m$^2$/g or between about 3 and about 100 m$^2$/g of resin. In yet another example, the specific surface area of the substrate is between about 10 and about 1,000 m$^2$/g, between about 10 and about 800 m$^2$/g, between about 10 and about 600 m$^2$/g, between about 10 and about 400 m$^2$/g, between about 10 and about 200 m$^2$/g or between about 10 and about 100 m$^2$/g of resin.

In one example, the substrate includes negatively or positively ionizable or charged groups, and these ionizable groups are "capped" by reaction with excess ligand or with another agent.

In exemplary embodiments, the substrate is suitable for chemical modification with an organic ligand. In one example, the substrate is an organic polymeric substrate. Such substrates can be modified with an organic ligand by taking advantage of functional groups present on the polymer. In one example, the polymer is a co-polymer of styrene and divinylbenzene (PS-DVB) functionalized with a ligand incorporating an amino group or a carboxylic acid group. The ligand may be derived from a thiol-group containing precursor. The thiol analog may be heated with the polymer in the presence of a radical initiator, such as 2,2'-azobis(2-methylpropionitrile).

In another example, the substrate is an inorganic substrate, such as silica. Silica can be covalently modified using reactive silyl ligands.

Exemplary ligands, linkers and methods of their attachment to the substrate are described hereinbelow.

(ii). Ligands

In various examples of the invention, the substrate is covalently modified with at least one type of POSS-containing ligand. Exemplary POSS groups that can be reacted with a substrate to form a material of the invention are set forth in FIG. 1-FIG. 4. The R groups in the POSS shown in FIGS. 1, 3 and 4 are generally selected from H, OH, substituent group that is selected from substituted or unsubstituted alkyl, substituted or unsubstituted heteroalkyl, substituted or unsubstituted aryl, substituted or unsubstituted heteroaryl, or substituted or unsubstituted heterocycloalkyl groups. In an exemplary embodiment, the R group is substituted with a reactive functional group as this term is generally understood in the art of synthetic organic chemistry and as exemplars of this genus are set forth herein.

Exemplary POSS ligands (1-8) are set forth FIG. 2. These ligands can be modified with a linker moiety or reacted with a linker grafted to a solid support. Alternatively, these ligands can be attached directly to a solid support.

With reference to FIG. 1, exemplary R groups include H; substituted or unsubstituted alkyl; substituted or unsubstituted alkenyl; substituted or unsubstituted aryl; alkyl or aryl amines; alkyl or aryl alcohols; alkyl or aryl carboxylic acids; alkyl or aryl sulfonates; alkyl or aryl imide; alkyl or aryl thiols; alkyl or aryl epoxides; fluoroalkyls; polyethylene glycols (PEGs); and silicon-containing moieties.

With reference to FIG. 3, exemplary R groups include H; substituted or unsubstituted alkyl; substituted or unsubstituted alkenyl; substituted or unsubstituted aryl; alkyl or aryl amine; alkyl or aryl alcohol; alkyl or aryl carboxylic acid; alkyl or aryl sulfonate; alkyl or aryl imide; alkyl or aryl thiol; alkyl or aryl epoxide; fluoroalkyls; poly ethylene glycols (PEGs); silicon-containing moiety; and OH (silanol).

With reference to FIG. 3, X is reactive functional group that can react with another functional group on the substrate surface. Exemplary reactive functional groups include H; alkyl or aryl amine; alkyl or aryl halide; alkyl or aryl alcohol; alkyl or aryl carboxylic acid; alkyl or aryl acyl chloride; alkyl or aryl sulfonyl chloride; alkyl or aryl anhydride; alkyl or aryl isocyanate; alkyl or aryl imide; alkyl or aryl thiol; alkyl or aryl epoxide; olefin-containing moiety; silicon-containing moiety; silanol; and polymerizable moiety.

With reference to FIG. 4, Table 1 provides exemplary materials of the invention.

TABLE 1

| Number | R | X |
|---|---|---|
| 9 | H | H |
| 10 | i-Butyl | $CH_2CH_2CH_2NH_2$ |

TABLE 1-continued

| Number | R | X |
|---|---|---|
| 11 | i-Octyl | $CH_2CH_2CH_2NH_2$ |
| 12 | Phenyl | $CH_2CH_2CH_2NH_2$ |
| 13 | $CH_2CH_2CH_2NH_2$ | $CH_2CH_2CH_2NH_2$ |
| 14 | i-Butyl | Glycidyl |
| 15 | Glycidyl | Glycidyl |
| 16 | i-Butyl | $PhCH_2Cl$ |
| 17 | i-Butyl | $CH_2CH_2CH_2Cl$ |
| 18 | Cyclohexyl | 3-(Maleimido)propyl |
| 19 | i-Butyl | Propylacylate |
| 20 | Propylmethacylate | Propylmethacylate |
| 21 | i-Butyl | Allyl |
| 22 | Vinyl | Vinyl |
| 23 | i-Butyl | $CH_2CH_2CH_2SH$ |
| 24 | i-Octyl | $CH_2CH_2CH_2SH$ |
| 25 | Cyclopentyl | $CH_2CH_2CH_2NCO$ |
| 26 | i-Butyl | $CH_2CH_2CH_2OH$ |
| 27 | i-Butyl | $CH_2CH_2CH_2SO_3Cl$ |
| 28 | i-Butyl | $CH_2CH_2CH_2CO_2Me$ |

With respect to FIG. 6, exemplary R moieties include H; substituted or unsubstituted alkyl; substituted or unsubstituted alkenyl; substituted or unsubstituted aryl; alkyl or aryl amines; alkyl or aryl alcohols; alkyl or aryl carboxylic acids; alkyl or aryl sulfonates; alkyl or aryl imide; alkyl or aryl thiols; alkyl or aryl epoxides; fluoroalkyls; poly ethylene glycols (PEGs); and silicon-containing moieties.

With respect to FIG. 8, exemplary R groups include H; substituted or unsubstituted alkyl, e.g., methyl, ethyl, iso-butyl, iso-octyl; substituted or unsubstituted alkenyl, e.g., allyl; aryl or substituted aryl, e.g., phenyl; alkyl or aryl amine; alkyl or aryl alcohol; alkyl or aryl carboxylic acid; alkyl or aryl sulfonate; alkyl or aryl imide; alkyl or aryl thiol; alkyl or aryl epoxide; fluoroalkyls; polyethylene glycols (PEGS); silicon-containing moieties; and OH (silanol).

With respect to FIG. 8, X and Y are reactive functional groups that react with one another to form Z. Exemplary X and Y groups are independently H; alkyl or aryl amine; alkyl or aryl halide; alkyl or aryl alcohol; alkyl or aryl carboxylic acid; alkyl or aryl acyl chloride; alkyl or aryl sulfonyl chloride; alkyl or aryl anhydride; alkyl or aryl isocyanate; alkyl or aryl imide; alkyl or aryl thiol; alkyl or aryl epoxide; olefin-containing moiety; silicon-containing moiety; silanol; and a polymerizable moiety, e.g., an olefin, vinyl, etc.

With respect to FIG. 8, Z is a linkage fragment formed from Y and X reacting, which can be but is not limited to: —$CH_2$—; amide; sulfonamide; carbamate; ester; —S—; —O—; —$CH_2$—S—; and —$CH_2$—$CH_2$—.

With respect to FIG. 8, $L^1$ can be but is not limited to substituted or unsubstituted alkyl or substituted or unsubstituted aryl with both ends covalently connected to the substrate surface and Z individually. In an exemplary embodiment $L^1$ is hydrocarbyl.

With respect to FIG. 8, $L^2$ can be but is not limited to substituted or unsubstituted alkyl or substituted or unsubstituted aryl with both ends covalently connected to the POSS moiety and Z individually. In an exemplary embodiment, $L^2$ is hydrocarbyl.

Figure 9:
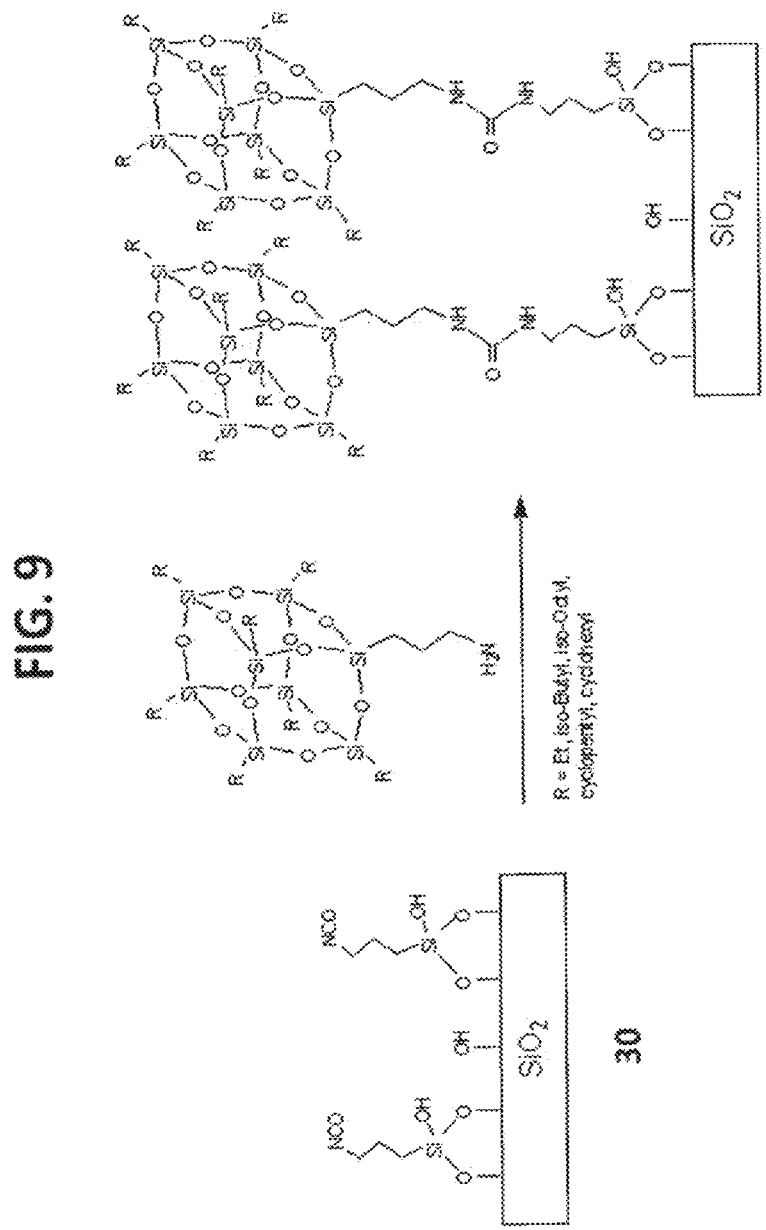
FIG. 9 shows the syntheses of $T_8$-POSS bonded phases 50, 51 and 52.
Figure 10:
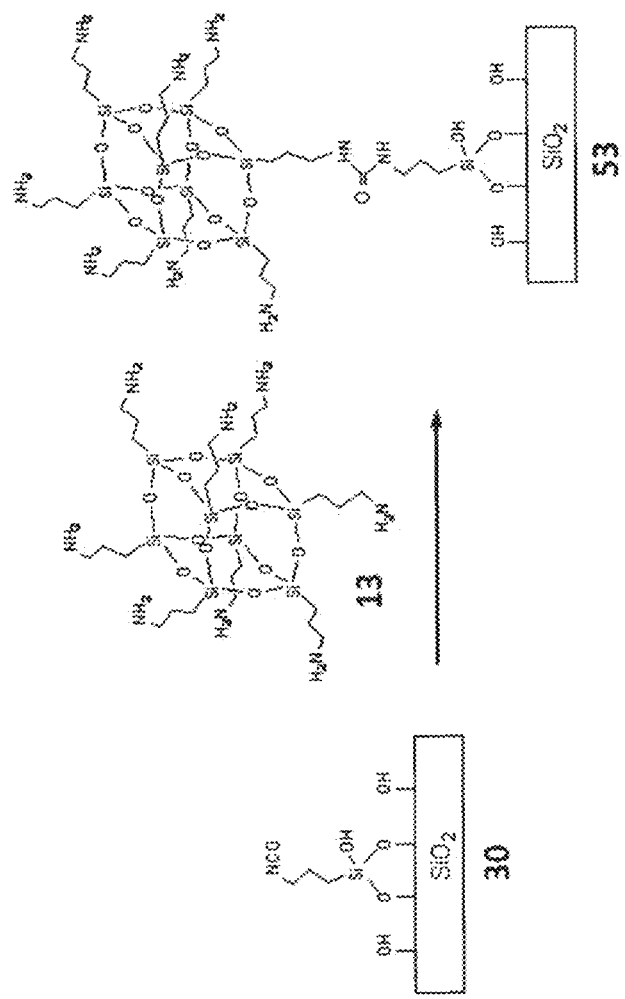
FIG. 10 shows the synthesis of $T_8$-POSS bonded phase 53.
Figure 11:
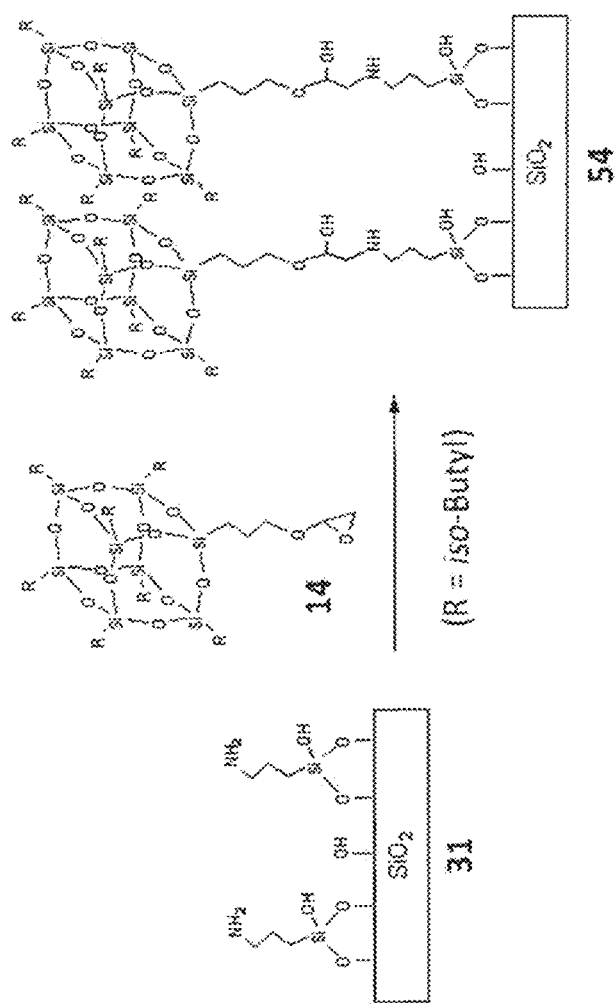
FIG. 11 shows the synthesis of $T_8$-POSS bonded phase 54.
Figure 12:
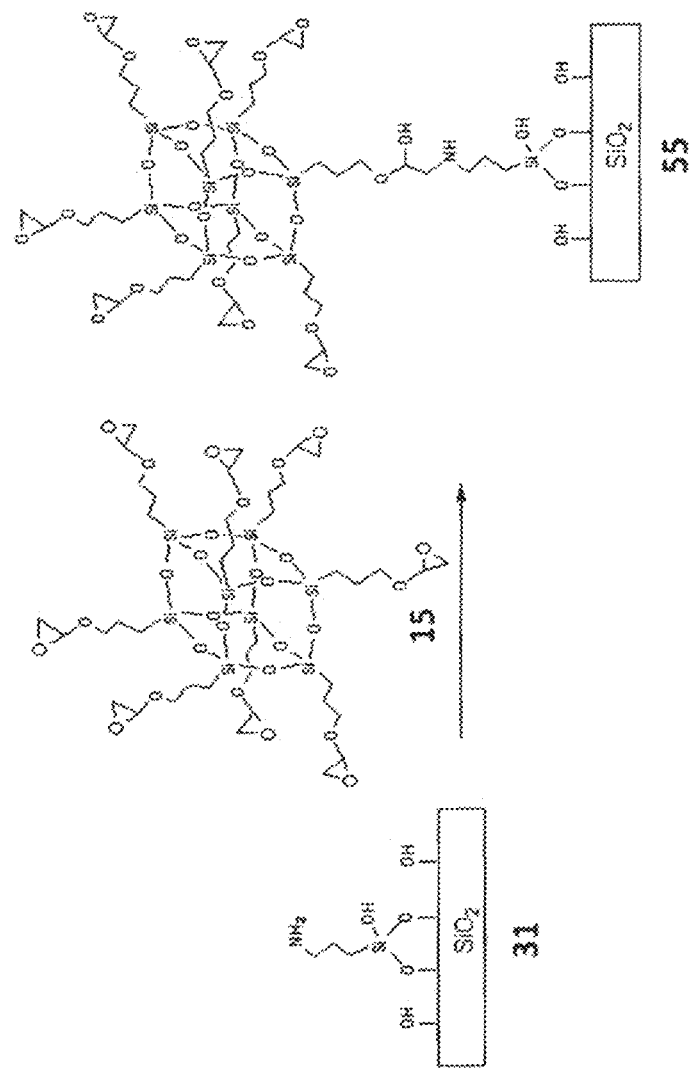
FIG. 12 shows the synthesis of $T_8$-POSS bonded phase 55.
Figure 13:
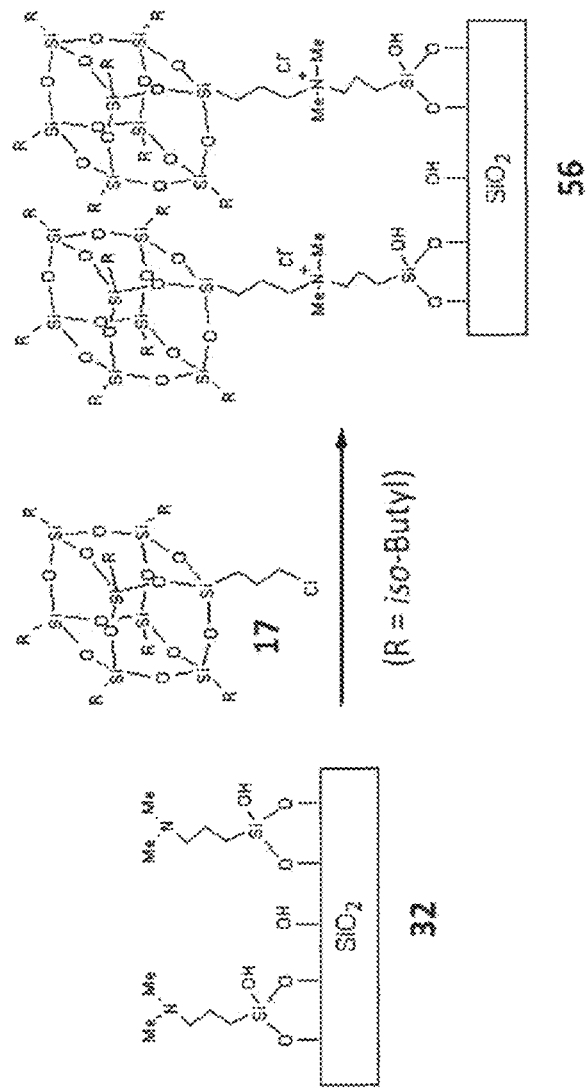
FIG. 13 shows the synthesis of $T_8$-POSS bonded phase 56.
Figure 14:
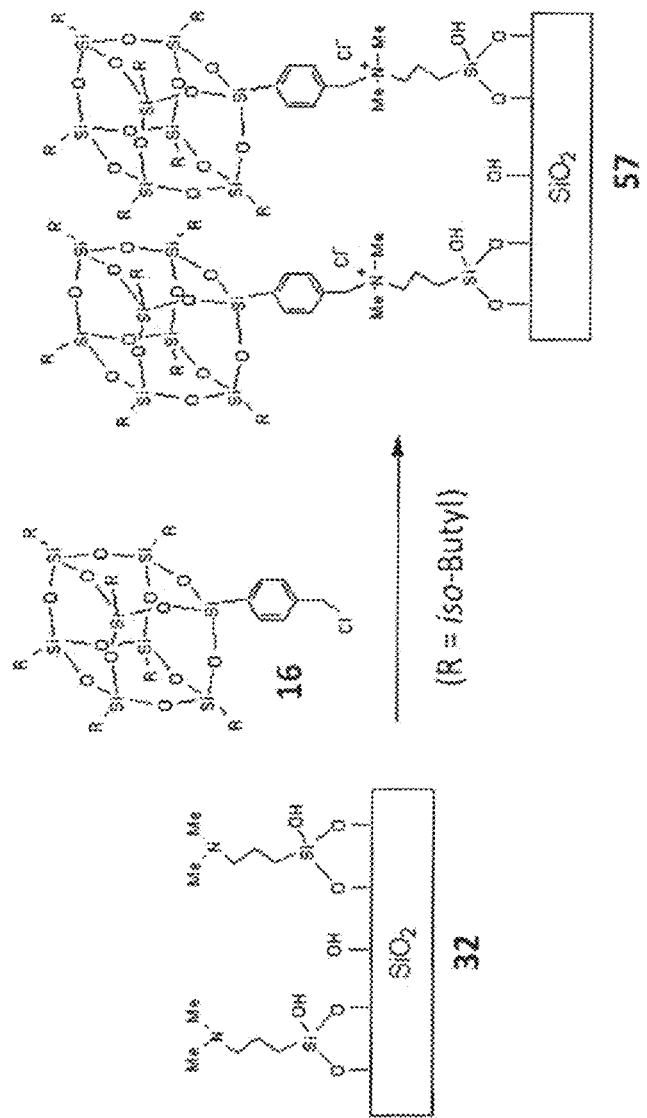
FIG. 14 shows the synthesis of $T_8$-POSS bonded phase 57.

With respect to FIG. 9, Table 2 provides exemplary embodiments.

TABLE 2

| R | POSS Compound | POSS Bonded Phase |
| --- | --- | --- |
| iso-Butyl | 10 | 50 |
| iso-Octyl | 11 | 51 |
| Phenyl | 12 | 52 |

Figure 15:
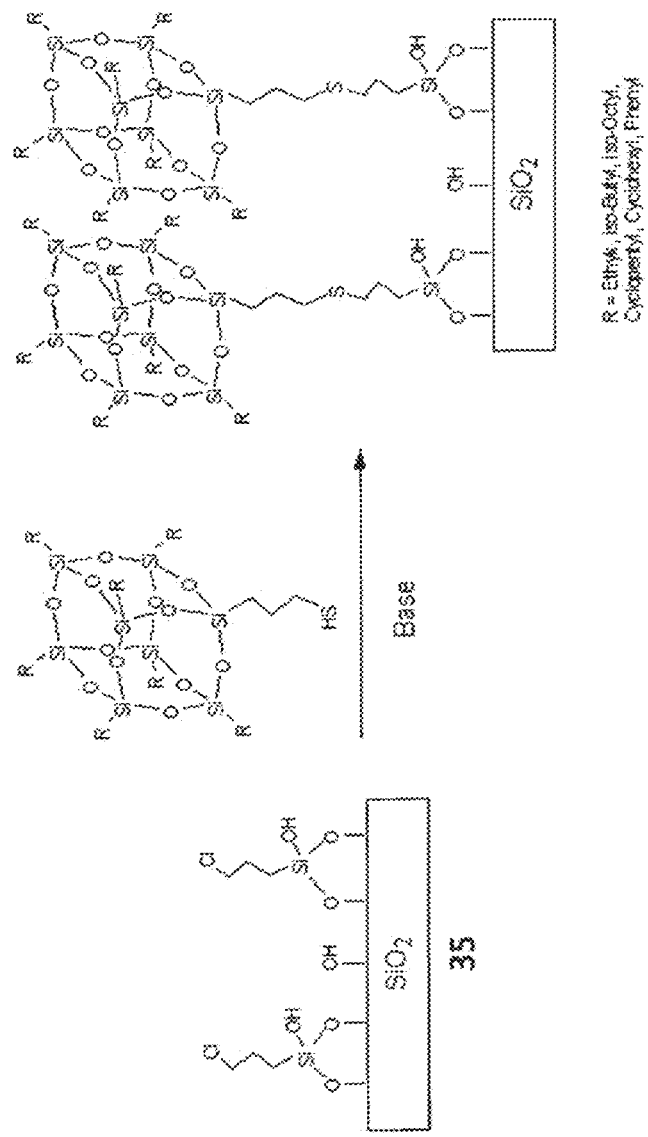
FIG. 15 shows the syntheses of $T_8$-POSS bonded phases 58 and 59.

With respect to FIG. 15, Table 3 provides exemplary compounds of the invention.

TABLE 3

| R | POSS Compound | POSS Bonded Phase |
| --- | --- | --- |
| iso-Butyl | 23 | 58 |
| iso-Octyl | 24 | 59 |

Figure 16:
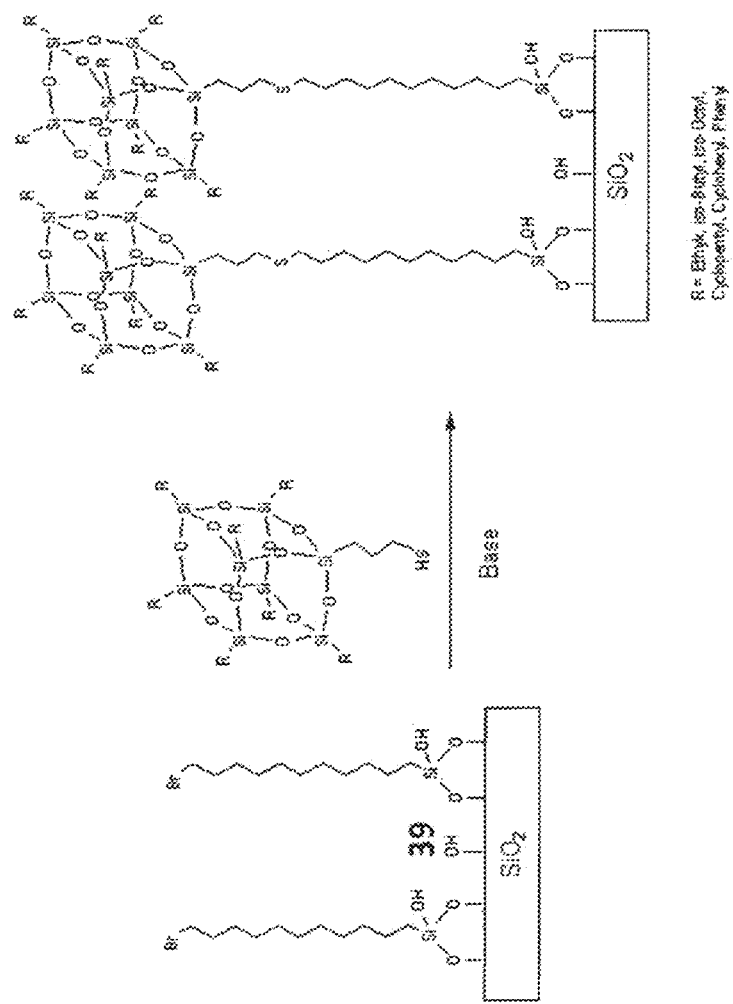
FIG. 16 shows the syntheses of $T_8$-POSS bonded phases 60 and 61.
Figure 17:
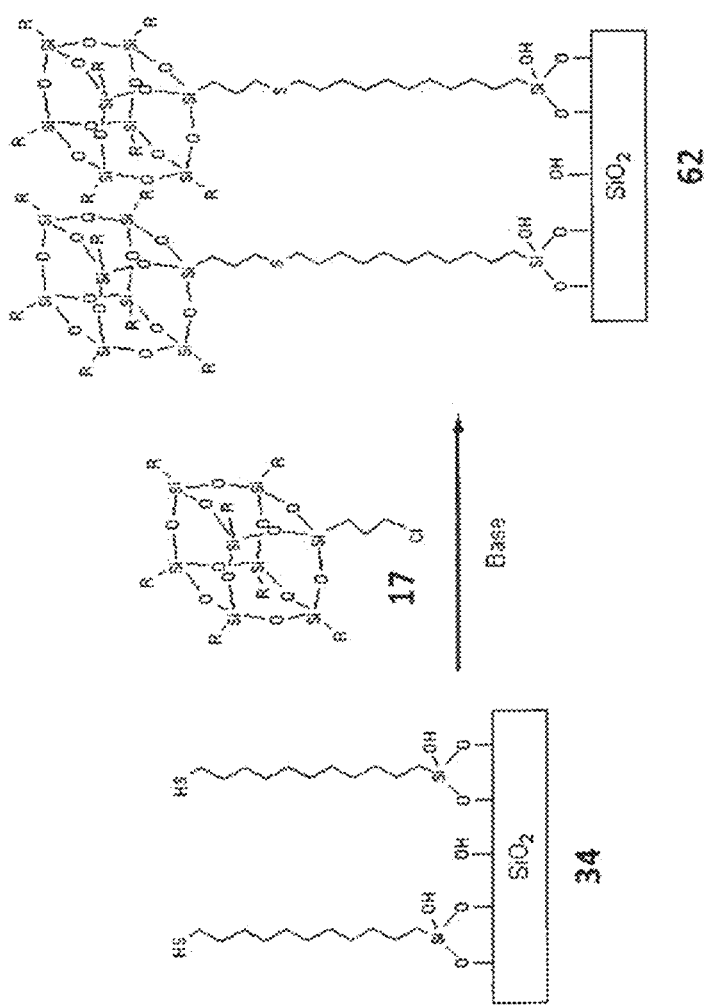
FIG. 17 shows the synthesis of $T_8$-POSS bonded phase 62.
Figure 18:
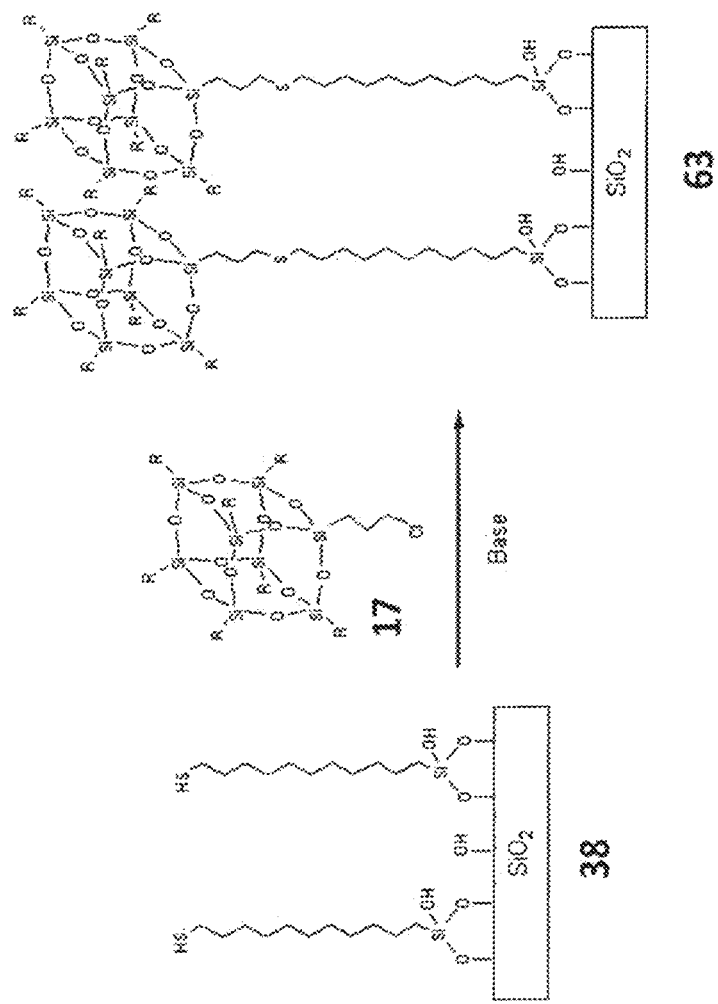
FIG. 18 shows the synthesis of $T_8$-POSS bonded phase 63.

With respect to FIG. 16, Table 4 provides exemplary compounds of the invention.

TABLE 4

| R | POSS Compound | POSS Bonded Phase |
| --- | --- | --- |
| iso-Butyl | 23 | 60 |
| iso-Octyl | 24 | 61 |

Figure 19:
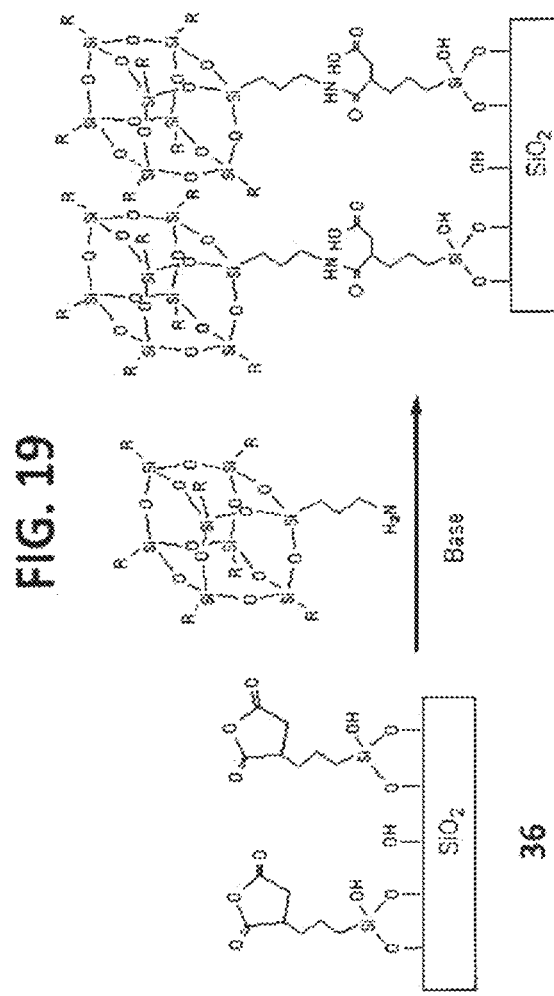
FIG. 19 shows the syntheses of $T_8$-POSS bonded phases 64, 65 and 66.

With respect to FIG. 19, Table 5 provides exemplary compounds of the invention.

TABLE 5

| R | POSS Compound | POSS Bonded Phase |
| --- | --- | --- |
| iso-Butyl | 10 | 64 |
| iso-Octyl | 11 | 65 |
| Phenyl | 12 | 66 |

Figure 22:
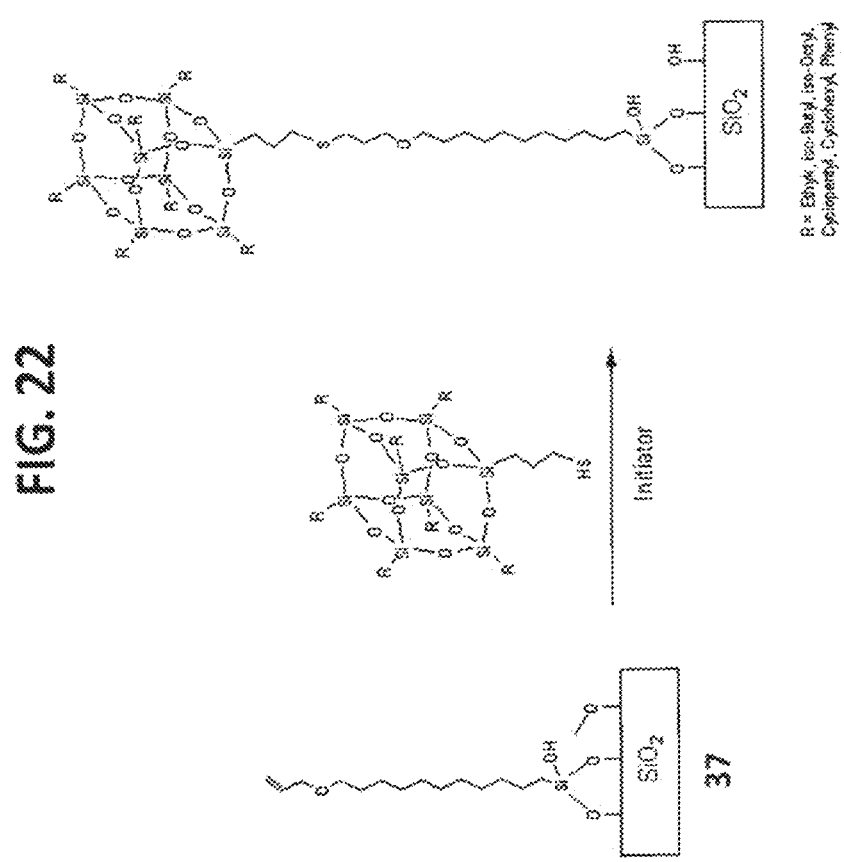
FIG. 22 shows the syntheses of $T_8$-POSS bonded phases 69 and 70.

With respect to FIG. 22, Table 6 provides exemplary compounds of the invention.

TABLE 6

| R | POSS Compound | POSS Bonded Phase |
| --- | --- | --- |
| iso-Butyl | 23 | 69 |
| iso-Octyl | 24 | 70 |

Figure 20:
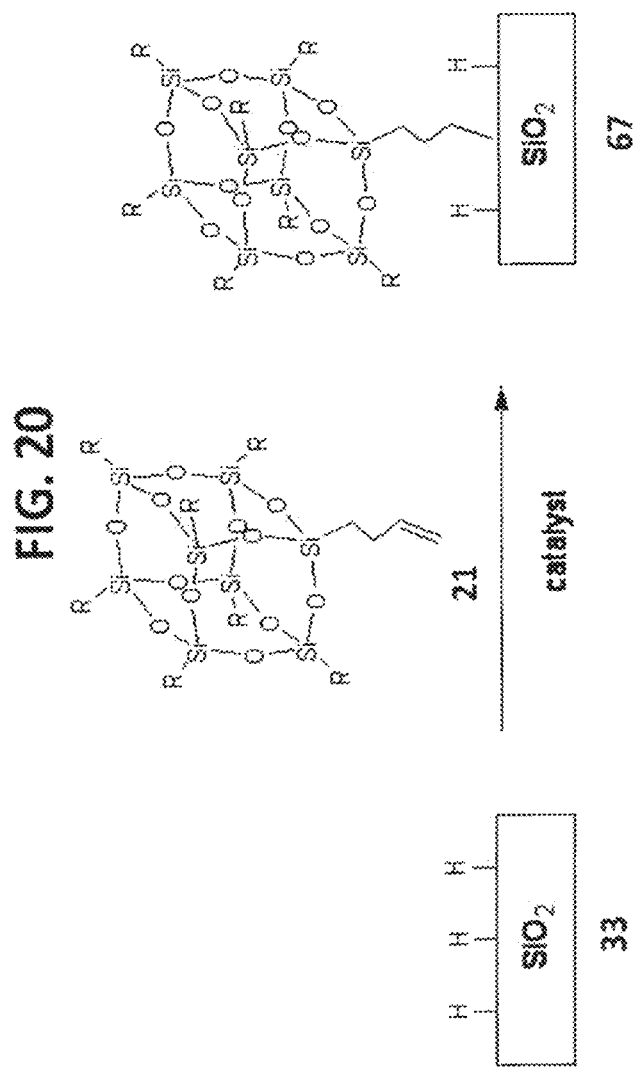
FIG. 20 shows the synthesis of $T_8$-POSS bonded phase 67.
Figure 21:
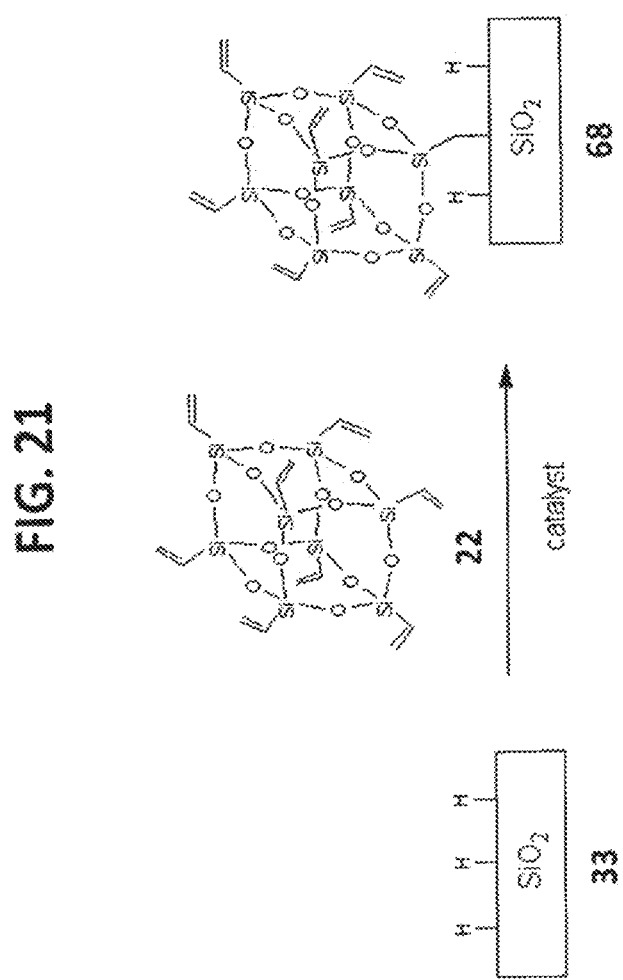
FIG. 21 shows the synthesis of $T_8$-POSS bonded phase 68.
Figure 23:
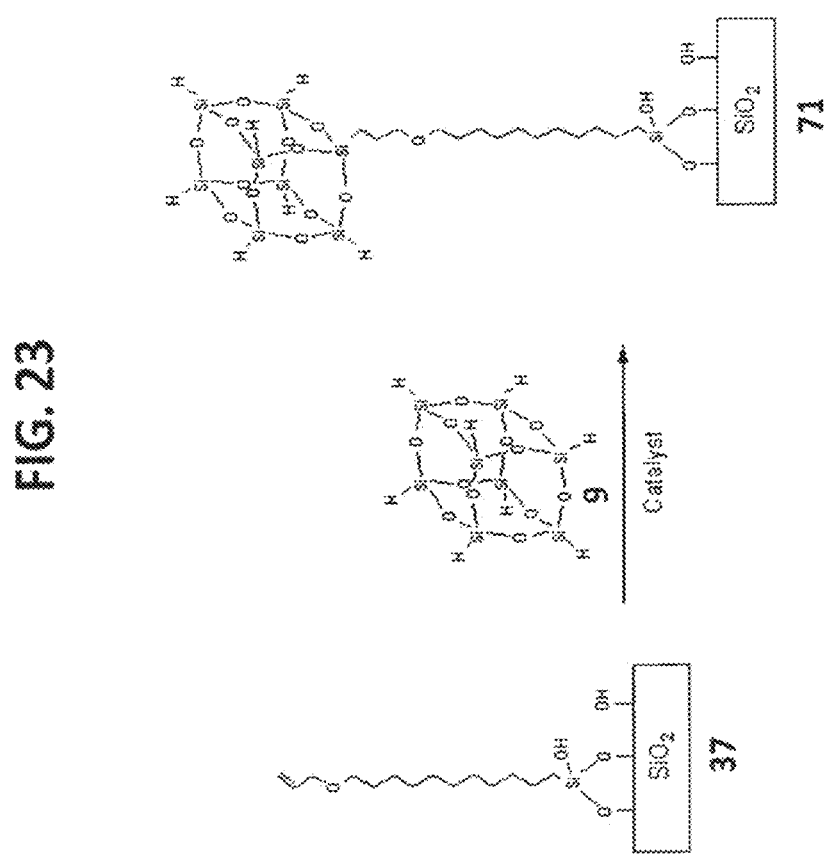
FIG. 23 shows the synthesis of $T_8$-POSS bonded phases 71.

Those of skill will appreciate that the present invention is described by reference to specific exemplars, however, the invention is not so limited and the full range of substituents, including reactive functional groups, can be incorporated into the full range of X, Y and R groups without limitation (iii) Attachment of Ligands to the Solid Support In various embodiments, the solid support is functionalized using reactive POSS ligands. For example, the reactive ligand includes a reactive functional group, useful for attachment to the solid support (FIG. 6 and FIG. 7). The reactive functional group of the ligand is capable of reacting with the solid support (e.g., with complementary reactive functional groups on the surface of the solid. In an exemplary embodiment, the POSS ligand is functionalized with a linker including a moiety providing a locus for grafting the linker to the solid support through reaction of complementary reactive groups on the linker and solid support (FIG. 20 and FIG. 21). In a further exemplary embodiment, the solid support includes a linker grafted thereto and the ligand includes a reactive functional group of reactivity complementary to the reactive functional group on the linker, allowing for the covalent attachment of the linker and the ligand (FIG. 23). In yet a further embodiment, the solid support includes a linker fragment $L^1$ (FIG. 5) and the POSS ligand includes a second linker fragment ($L^2$). Each linker fragment includes a reactive functional group having a reactivity complementary to that of the other. Upon reaction, the group "Z" is formed, affording the structure SS-$L^1$-Z-$L^2$-POSS (FIG. 8-FIG. 19 and FIG. 22), in which SS is a solid support.

Methods for the attachment of ligands to inorganic substrates, such as silica substrates are known. Exemplary methods are described herein and, e.g., in WO2006/088760 (filed Feb. 10, 2006), US2006/0054559 (filed Sep. 10, 2004), WO2005/047886 (filed Oct. 4, 2004), U.S. patent application Ser. No. 11/753,934 (filed May 25, 2007), H. Minakuchi et al., *Anal. Chem.* 1996, 68: 3498-3501, H. Minakuchi et al., *J. Chromatogr.* 1998, 797: 121-131 U.S. Pat. Nos. 6,248,798, 5,968,363, 5,865,994, 5,936,003 and 5,925,253, the disclosures of which are each incorporated herein by reference for all purposes.

In one example, the reactive ligand (or linker component) includes a reactive silyl group. For example, the reactive silyl group can react with the surface of a silica substrate comprising surface silanol (e.g., Si—OH) groups to create siloxane bonds between the silyl ligand and the silica substrate. In various embodiments, the reactive ligand includes an activated silyl group having a structure according to Formula (III):

(X)

In exemplary silyl groups according to Formula (X), $R^{20}$, $R^{21}$ and $R^{22}$ are independently selected silyl group substituents, and at least one of these substituents is an active silyl group. An activated silyl group includes at least one reactive silyl group substituent. A reactive silyl group substituent is capable of reacting with a substrate as defined herein to form a covalent bond between the ligand (or linker component) and the substrate. Thus, at least one of $R^{20}$, $R^{21}$ and $R^{22}$ comprises a reactive silyl group substituent. Exemplary reactive silyl group substituents include alkoxy groups, halogens, primary or secondary amino groups and carboxylic acid groups.

In one embodiment, $R^{20}$, $R^{21}$ and $R^{22}$ are members independently selected from halogen, $OR^{14}$, $NR^{14}R^{15}$, $OC(O)R^{16}$, $OS(O)_2R^{16}$, acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In one embodiment, at least one of $R^{20}$, $R^{21}$ and $R^{22}$ is other than OH, unsubstituted alkyl, unsubstituted aryl, unsubstituted heteroaryl and unsubstituted heterocycloalkyl. In another embodiment, at least one of $R^{20}$, $R^{21}$ and $R^{22}$ is alkoxy or halogen. Exemplary reactive silyl groups useful for the covalently linkage of a reactive ligand to the solid support include:

—Si(OMe)$_3$; —SiMe(OMe)$_2$; —SiMe$_2$(OMe); —Si(OEt)$_3$; —SiMe(OEt)$_2$; —SiMe$_2$(OEt), —SiCl$_3$, —SiMeCl$_2$; —SiMe$_2$Cl, —SiCl$_2$(OMe), and —SiCl(OMe)$_2$.

In various embodiments, at least one of $R^{20}$, $R^{21}$ and $R^{22}$ is a non-reactive silyl group substituent, which includes a linker, linker component or the linker tethered to the POSS. In another example, two of $R^{20}$, $R^{21}$ and $R^{22}$ are non-reactive silyl group substituents. In addition to the linker-POSS moiety, exemplary non-reactive silyl group substituents include alkyl groups or aryl groups. In one embodiment, one of $R^{20}$, $R^{21}$ and $R^{22}$ is the linker-POSS moiety and another is a member selected from unsubstituted $C_1$-$C_6$ alkyl (e.g., methyl, ethyl, n-propyl, iso-propyl, n-butyl, iso-butyl and the like).

In one example, the reactive ligand, which is used for covalent modification of the solid support includes a POSS moiety. Alternatively, the reactive ligand includes a group, which can be covalently attached to a POSS moiety after coupling of the reactive ligand to the solid support. For example, the reactive ligand can contain a reactive group or a protected reactive group, which is reacted with a reactive POSS moiety, thereby conjugating the POSS moiety to the linker.

Any number of different ligands can be bound to the solid support. In one example, the functional layer consists essentially of one type of ligand. In another example, the functional layer includes at least two different ligand structures. When two or more ligand structures are present, the structures can differ in the identity of the POSS moiety, the linker or both. For example, in addition to the linker-POSS moiety, the compositions of the invention can further include reverse-phase (e.g., $C_8$ or $C_{18}$) and/or ion exchange ligands bound to the same solid support.

The ligands can optionally include additional polar groups (e.g., ether, thioether, amide, sulfonamide, urea, thiourea, carbonate, carbamate, and the like). In an exemplary embodiment, one or more polar group is internal to the linker.

In one embodiment, the linker has at least 6, at least 7, at least 8, at least 9, at least 10, at least 11 or at least 12 carbon atoms in sequence. In various embodiments, at least two of the carbon atoms in sequence are optionally part of a substituted or unsubstituted ring (e.g., substituted or unsubstituted aryl, substituted or unsubstituted heteroaryl, or substituted or unsubstituted cycloalkyl). In one example, the linker is a hydrophobic moiety sufficiently hydrophobic for the ligand to exhibit reversed phase characteristics. In this example, the linker provides a component of a reverse-phase moiety. Hence, in one example, the linker includes at least 8, at least 9, at least 10, at least 11, at least 12, at least 13, at least 14, at least 15, or at least 16 carbon atoms in sequence. For example, when the linker includes a hydrophobic moiety, the resulting stationary phase of the invention provides reverse-phase capabilities in addition to aromatic and steric selection capabilities. Such a material can be used, e.g., to analyze uncharged molecules in addition to ionic or ionizable analytes (e.g., within the same sample). The added reverse phase capabilities can be exploited to analyze samples containing organic hydrophobic and/or polar molecules in addition to ionic or ionizable molecules.

(iv). Attachment of Ligands to an Organic (Polymeric) Solid Support

Methods for the attachment of ligands to organic substrates, such as polymeric resins are known to those of skill in the art. In one example, the substrate is prepared from monomers, which after polymerization provide unsaturated groups, such as vinyl groups. In one example, the polymer is a co-polymer of styrene and divinylbenzene (PS-DVB). The unsaturated groups (e.g., vinyl groups) of these resins can be used to attach an ion-exchange ligand. In one example, the ligand includes a thiol-group, which is added to the double bond via an addition mechanism involving radical intermediates, thereby forming a thio-ether bond between the ligand and the solid support. Such reactions are described, e.g., in WO/03022433 (filed Sep. 5, 2002). An exemplary method is illustrated in Scheme 1, below:

Scheme 1:

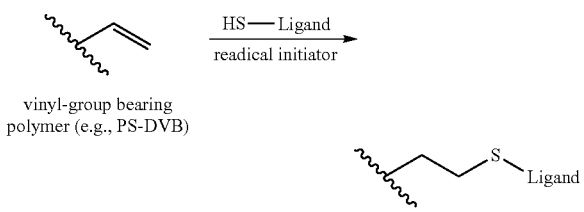

vinyl-group bearing polymer (e.g., PS-DVB)

In another approach, the organic polymeric solid support incorporates a monomer that provides a reactive functional group, which can be used to covalently link ligand to the solid support. In one example, the monomer incorporates a carboxylic acid group or an ester group, which can be hydrolyzed to form a carboxylic acid group after polymerization. Exemplary monomers according to this example include acrylic acid, methacrylic acid, alkyl (e.g., methyl or ethyl) acrylates and alkyl (e.g., methyl or ethyl) methacrylates. The carboxylic acid group can be reacted with a complimentary reactive functional group on the ligand. In one example, the ligand includes an amino group, which can be reacted with the carboxylic acid group to form an amide bond between the solid support and the ligand. The carboxylic acid group can be activated, for example, by formation of an acid chloride prior to reaction with the reactive ligand.

In another example, the polymeric solid support incorporates a monomer that includes an epoxide group. The epoxide ring can be opened using a nucleophilic ligand thereby forming a covalent bond between the ligand and the solid support. For example, the ligand can include an amino group (e.g., a primary amino group) or a sulfhydryl group, which can react with the epoxide ring to form, e.g., an amine or a thio-ether linkage between the ligand and the solid support, respectively. Exemplary monomers that include an epoxide ring and can be incorporated into a polymer include glycidyl acrylate, glycidyl methacrylate, 2-glycidyloxyethyl methacrylate, vinylbenzyl glycidyl ether, 2-(4-vinylbenzyloxy)ethyl glycidyl ether.

In yet another example, the polymeric solid support incorporates a monomer that includes a leaving group, such as a halogen substituent, which can, e.g., be replaced with a nucleophilic ligand in a nucleophilic substitution reaction thereby forming a covalent bond between the ligand and the solid support. An exemplary monomer is vinylbenzyl chloride.

In a further example, the polymeric solid support incorporates a monomer that includes a hydroxyl group or a sulfhydryl group. The hydroxyl group can, e.g., be used to covalently link a ligand to the solid support via the formation of an ether-bond or a thio-ether bond, respectively. Exemplary monomers incorporating a hydroxyl group include vinylbenzyl alcohol and 2-(4-vinylbenzyloxy)ethanol.

B. Columns

The current invention also provides embodiments, in which the compositions of the invention are contained in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC, ultra pressure). Plastic columns may be those commonly employed for preparative chromatography systems. Such polymeric columns are frequently disposable and are often referred to as cartridges. Hence, in one embodiment, the invention provides a chromatography column packed with a separation medium that includes a composition of the invention. In another example, the invention provides a chromatography column including a monolithic composition of the invention. In yet another example, the invention provides a composition of the invention in a flow-through bed suitable for use as a chromatographic medium.

IV. Methods

The compositions and compounds of the invention may be synthesized using methods known in the art and those described herein. Variation of those methods may be necessary to synthesize compositions of certain embodiments. Those alternative methods will be apparent to and within the skills of a person of skill in the art. Starting materials and reagents useful for preparing the compositions and compounds of the invention are commercially available or can be prepared using art-recognized methodologies. Exemplary methods for the preparation of reactive silyl ligands and the preparation of exemplary functionalized substrates are provided e.g., in WO2006/088760 (filed Feb. 10, 2006), WO2006/054559 (filed Sep. 10, 2004) and WO2005/047886 (filed Oct. 4, 2004), the disclosures of which are each incorporated herein by reference for all purposes. Other reactive silyl ligands are commercially available.

An exemplary method of preparing a stationary phase of the invention includes covalently bonding ligands, as set forth herein, to at least the exterior surface or to both the interior and exterior surface of the solid support. As used herein "bonding" includes the act of assembling a linker-POSS cassette on the solid support. The ligands include at least one POSS moiety and at least one linker covalently attached to the substrate and to the POSS moiety.

A. Chromatographic Methods

The current invention further provides a chromatographic method (e.g., for separating analytes in a liquid sample). The method involves flowing a liquid sample through a monolith, or a packed bed of separation medium, that includes a composition of the invention. In one example, the liquid includes an analyte. For example, the liquid includes at least one type of aromatic compound. In exemplary embodiments, the method of the invention allows for the separation of two or more aromatic compounds. The method of the invention further allows the separation of one or more aromatic compound from one or more non-aromatic compound. The verb "to separate" or any grammatical version thereof, in this context, refers to at least two analytes eluting from a separation medium, each with a separate peak, preferably with baseline separation between the at least two peaks.

In one example, the mobile phase useful in the methods of the invention, includes water. The water content of the mobile phase is preferably between about 0.1% (v/v) and 100% (v/v), more preferably between about 1% and about 100% (v/v), even more preferably between about 10% and about 100% (v/v) and most preferably between about 20% and about 100% (v/v).

The invention further provides a method of separating analytes in a liquid sample comprising flowing said liquid sample through a chromatographic medium comprising a composition of the invention.

Figure 25:
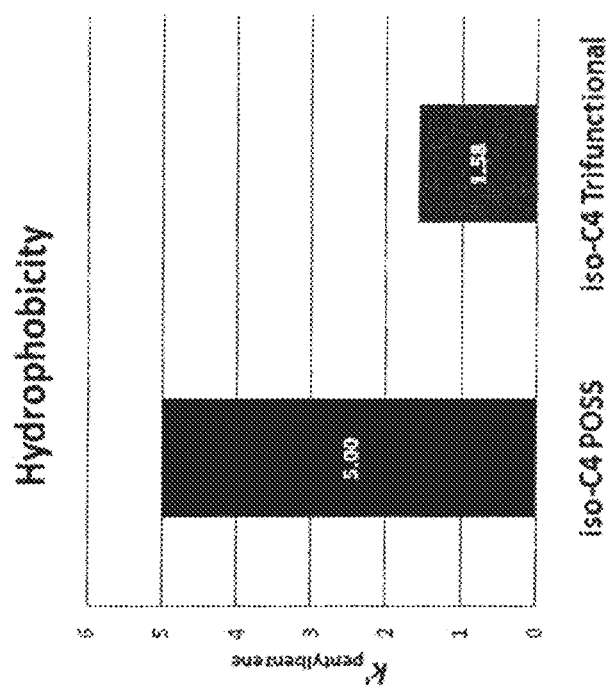
FIG. 25 shows the hydrophobicity comparison between the iso-butyl POSS phase (43) and the iso-butyl trifunctional phase (72). It is clear that the iso-butyl POSS modified phase provides higher (3-fold) hydrophobic retention than the iso-butyl trifunctional phase prepared by conventional silane reaction, indicating a higher bonding density.
Figure 26:
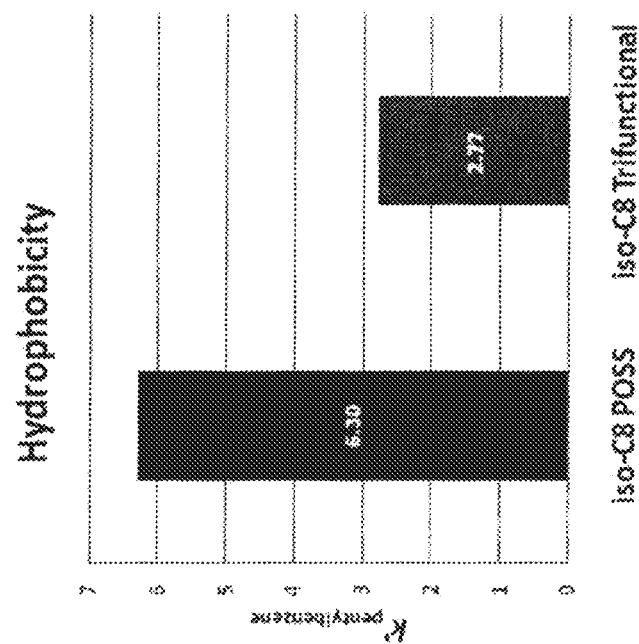
FIG. 26 shows the hydrophobicity comparison between the iso-octyl POSS phase (44) and the iso-octyl trifunctional phase (73). It is clear that the iso-octyl POSS modified phase provides higher (>2-fold) hydrophobic retention than the iso-octyl trifunctional phase prepared by conventional silane reaction, indicating a higher bonding density.

In an exemplary embodiment, the methods of the invention have properties improved over those of methods using analogous solid supports which are not based on POSS. For example, as shown in FIG. 25, the iso-butyl POSS modified phase provides higher (3-fold) hydrophobic retention than the iso-butyl trifunctional phase prepared by conventional silane reaction, indicating a higher bonding density. FIG. 26 shows that the iso-octyl POSS modified phase provides higher (>2-fold) hydrophobic retention than the iso-octyl trifunctional phase prepared by conventional silane reaction, indicating a higher bonding density.

Figure 27:
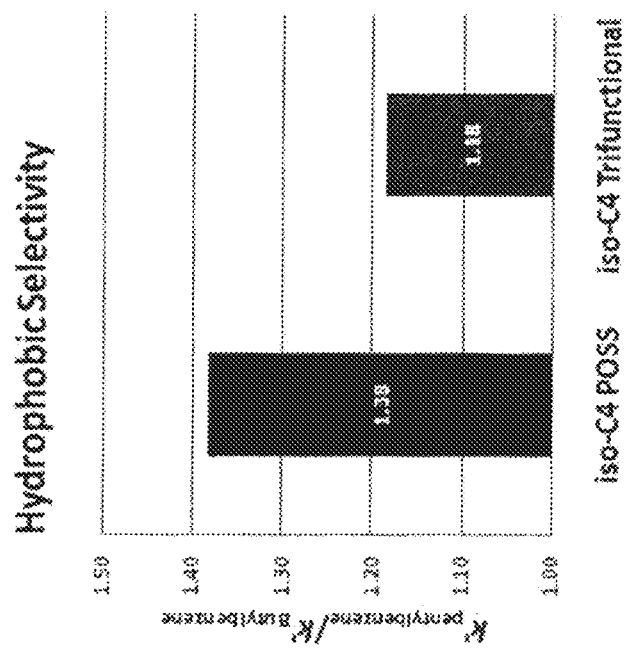
FIG. 27 shows the hydrophobic selectivity comparison between the iso-butyl POSS phase (43) and the iso-butyl trifunctional phase (72). It is clear that the iso-butyl POSS modified phase provides higher hydrophobic selectivity than the iso-butyl trifunctional phase prepared by conventional silane reaction, indicating a higher bonding density.
Figure 28:
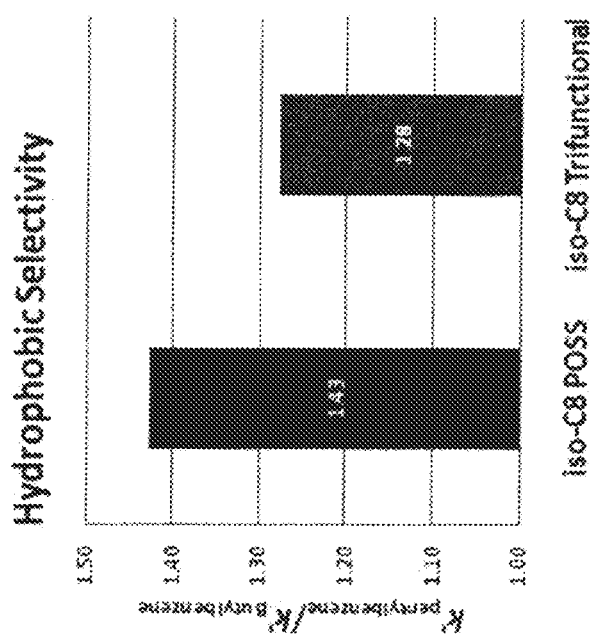
FIG. 28 shows the hydrophobic selectivity comparison between the iso-octyl POSS phase (44) and the iso-octyl trifunctional phase (73). It is clear that the iso-octyl POSS modified phase provides higher hydrophobic selectivity than the iso-octyl trifunctional phase prepared by conventional silane reaction, indicating a higher bonding density.

FIG. 27 shows that the iso-butyl POSS modified phase provides higher hydrophobic selectivity than the iso-butyl trifunctional phase prepared by conventional silane reaction, indicating a higher bonding density. FIG. 28 shows that the iso-octyl POSS modified phase provides higher hydrophobic selectivity than the iso-octyl trifunctional phase prepared by conventional silane reaction, indicating a higher bonding density.

Figure 29:
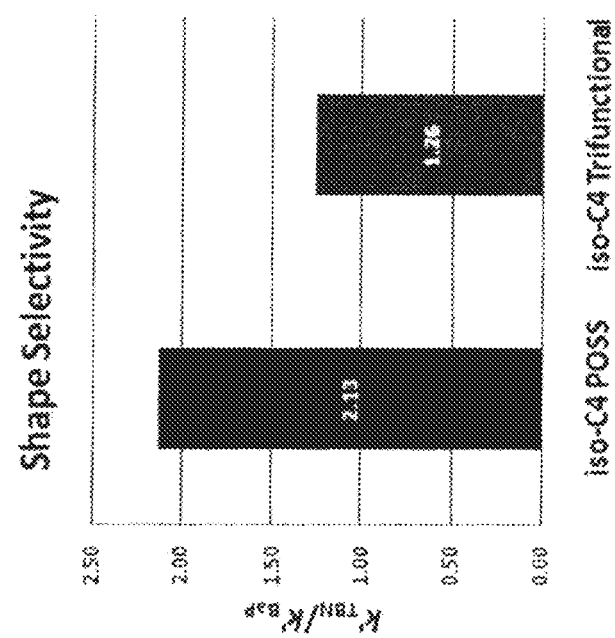
FIG. 29 shows the shape selectivity comparison between the iso-butyl POSS phase (43) and the iso-butyl trifunctional phase (72). It is clear that the iso-butyl POSS modified phase provides very different shape selectivity than the iso-butyl trifunctional phase prepared by conventional silane reaction.

FIG. 29 shows that the iso-butyl POSS modified phase provides very different shape selectivity than the iso-butyl trifunctional phase prepared by conventional silane reaction.

Figure 30:
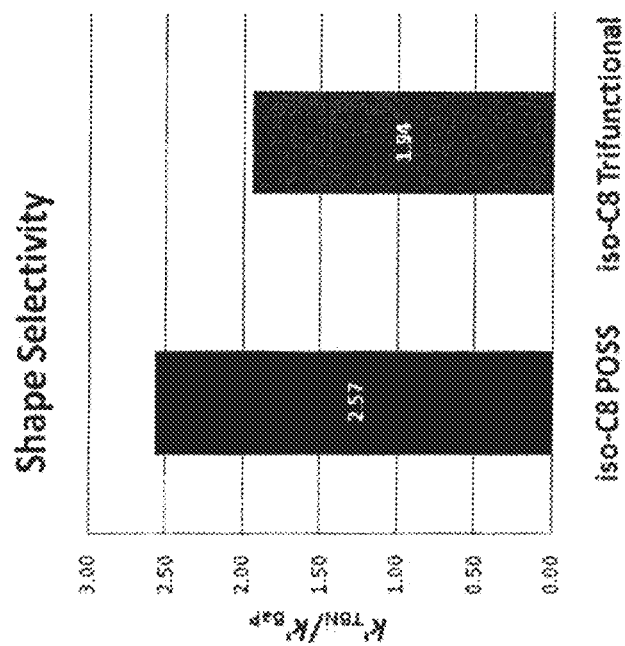
FIG. 30 shows the shape selectivity comparison between the iso-octyl POSS phase (44) and the iso-octyl trifunctional phase (73). It is clear that the iso-octyl POSS modified phase provides very different shape selectivity than the iso-octyl trifunctional phase prepared by conventional silane reaction.

FIG. 30 shows that the iso-octyl POSS modified phase provides very different shape selectivity than the iso-octyl trifunctional phase prepared by conventional silane reaction.

Figure 31:
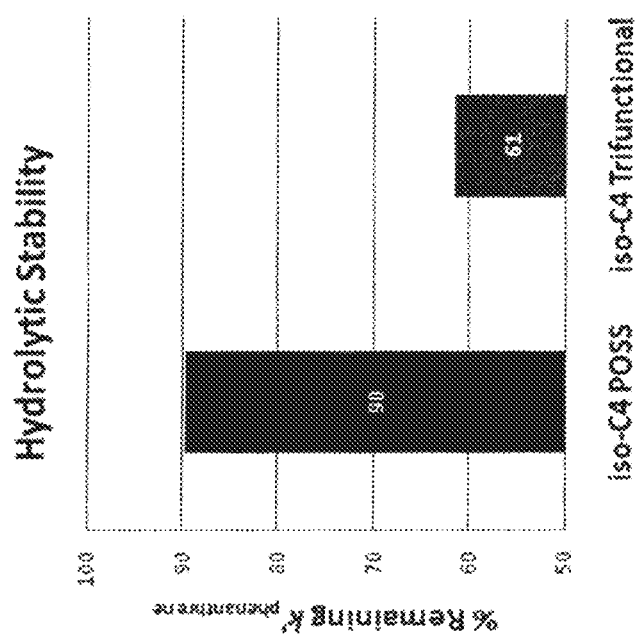
FIG. 31 shows the low pH hydrolytic stability comparison between the iso-butyl POSS phase (43) and the iso-butyl trifunctional phase (72). It is clear that the iso-butyl POSS modified phase provides higher hydrolytic stability than the iso-butyl trifunctional phase prepared by conventional silane reaction, indicating better bonding coverage and higher steric selectivity at the bonding sites.
Figure 32:
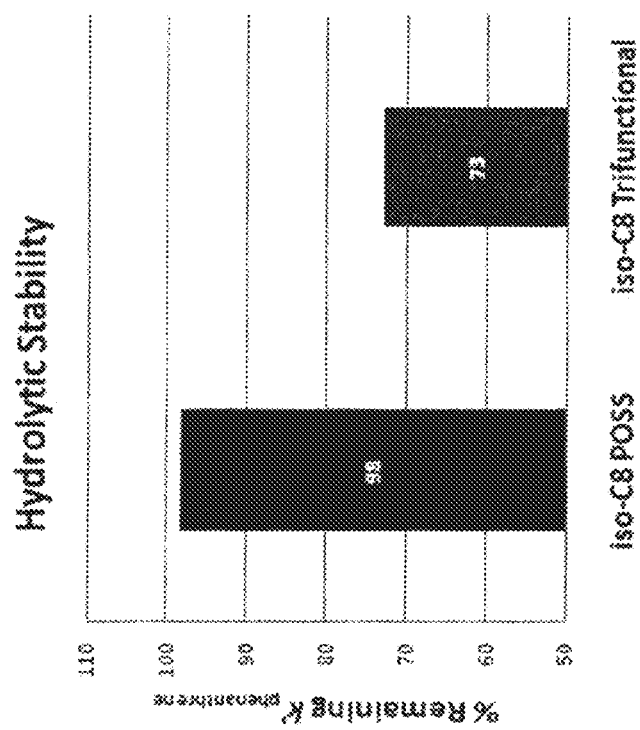
FIG. 32 shows the low pH hydrolytic stability comparison between the iso-octyl POSS phase (44) and the iso-octyl trifunctional phase (73). It is clear that the iso-octyl POSS modified phase provides higher hydrolytic stability than the iso-octyl trifunctional phase prepared by conventional silane reaction, indicating better bonding coverage and higher steric selectivity at the bonding sites.

FIG. 31 shows that the iso-butyl POSS modified phase provides higher hydrolytic stability than the iso-butyl trifunctional phase prepared by conventional silane reaction, indicating better bonding coverage and higher steric selectivity at the bonding sites. FIG. 32 shows that the iso-octyl POSS modified phase provides higher hydrolytic stability than the iso-octyl trifunctional phase prepared by conventional silane reaction, indicating better bonding coverage and higher steric selectivity at the bonding sites.

Accordingly, the present invention provides chromatographic methods for separating analytes that exhibit properties improved over those of analogous silyl-based stationary phases including, but not limited to greater hydrophobicity, greater hydrophobic selectivity, greater shape selectivity and greater hyrdolytic stability than analogous silyl-based stationary phases. Exemplary analogous POSS and silyl-based ligands and stationary supports are those in which the carbon-containing portion of the ligand has an equal number of carbon atoms (i.e., iso-octyl POSS is analogous to iso-octyl silyl). Though the ligands are analogous, in exemplary embodiments, they produce stationary supports having different surface coverage properties. For example, exemplary POSS ligands provide a discontinuous stationary phase having "islands" of carbon-containing species while analogous silyl ligands provide a more homogeneous surface.

Each of the embodiments and examples outlined herein above for the compositions of the invention, equally apply to the methods of the invention. For example, each embodiment regarding the type of the solid support, the size of the solid support particles, the pore size, the structure and nature of the organic ligands, the type and nature of the linker moiety and the structure of the POSS moiety as outlined hereinabove, is equally applicable to all compositions and methods of the invention.

The invention is further illustrated by reference to the non-limiting examples below.

EXAMPLES

Example 1

1) Functionalization—General Conditions
General Synthetic Procedure of Making $T_7$-POSS Bonded Phases 42-49

A selected $T_7R_7(OH)_3$-POSS compound is dissolved in an appropriate high boiling point solvent in a round bottom flask. A suitable quantity of silica gel is dispersed in this solution. After reflux for 24 to 96 hours, the reaction mixture is filtered. The cake is then washed with sufficient quantity of a suitable solvent in which the POSS compound can be dissolved. The resulting material is dried in a vacuum oven at 60° C. for 12 hours.

Alternatively, a $T_7R_7(OH)_3$-POSS compound is dissolved in an appropriate low boiling point solvent in a round bottom flask. Then a suitable quantity of silica gel is dispersed in this solution. After carefully removing all volatiles on a rotovap under reduced pressure, the resulting substance is heated at 160° C. for 12 hours. Then the reaction mixture is filtered and the cake is washed with sufficient quantity of a suitable solvent in which the POSS compound can be dissolved. The resulting material is dried in a vacuum oven at 60° C. for 12 hours.

Depending on the application, the POSS bonded phase can be further functionalized with an end-capping agent (e.g., hexamethyldisilazane) to minimize the number of silanol groups on the surface.

General Synthetic Procedure for $T_8$-POSS Bonded Phases (50-71)

A selected $T_8R_7X$-POSS compound is dissolved in an appropriate solvent in a round bottom flask. A suitable quantity of silica gel is dispersed in this solution. Depending on the nature of the reaction, the solution may be cooled, heated, or additional reagents may be added such as base or catalyst to facilitate the transformation. After reflux for 24 to 96 hours, the reaction mixture is filtered. The cake is then washed with sufficient quantity of a suitable solvent in which the POSS compound can be dissolved. The resulting material is dried in a vacuum oven at 60° C. for 12 hours. Depending on the application, the POSS bonded phase can be further functionalized with an end-capping agent (e.g., hexamethyldisilazane) to minimize the number of silanol groups on the surface.

For demonstration purpose, the examples for POSS bonded phase preparation in this invention use high purity, porous, spherical silica gel with the following physical properties: average particle size, 3 or 5 μm; specific surface area, 100, 200, or 300 m$^2$/g; mean pore size, 120, 200, or 300 Å; pore volume, ~1.00 mL/g.

Example 2

Synthesis of iso-Butyl-$T_7$ POSS Phase (43)

10 g Trisilanolisobutyl POSS (3) is dissolved in 100 mL of decane in a 200-mL round bottom flask. 10 g of raw silica gel (5.0 μm; specific surface area, 300 m$^2$/g; mean pore size, 120 Å; pore volume, 1.00 mL/g) is dispersed in this solution. After reflux for 72 hours, the reaction mixture is filtered. The cake is then washed with sufficient quantity of heptane. The resulting material is dried in a vacuum oven at 60° C. for 12 hours. The elemental analysis yields a carbon content of 7.01%, which corresponds to a ligand density of 3.88 μmol/m$^2$.

Example 3

Synthesis of iso-Octyl-$T_7$ POSS Phase (44)

10 g Trisilanolisooctyl POSS (4) is dissolved in 100 mL of decane in a 200-mL round bottom flask. 10 g of raw silica gel (5.0 μm; specific surface area, 300 m$^2$/g; mean pore size, 120 Å; pore volume, 1.00 mL/g) is dispersed in this solution. After reflux for 72 hours, the reaction mixture is filtered. The cake is then washed with sufficient quantity of heptane. The resulting material is dried in a vacuum oven at 60° C. for 12 hours. The elemental analysis yields a carbon content of 9.37%, which corresponds to a ligand density of 3.85 μmol/m$^2$.

Example 4

Synthesis of Phenyl-$T_7$ POSS Phase (46)

10 g Trisilanolphenyl POSS (6) is dissolved in 100 mL acetone a 200-mL round bottom flask. Then 10 g of raw silica gel (5.0 μm; specific surface area, 300 m$^2$/g; mean pore size, 120 Å; pore volume, 1.0 mL/g) is dispersed in this solution. After carefully removing all volatiles on a rotovap under reduced pressure, the resulting substance is heated at 160° C. for 12 hours. Then the reaction mixture is filtered and the cake is washed with sufficient quantity of acetone. The elemental analysis yields a carbon content of 9.90%, which corresponds to a ligand density of 5.60 μmol/m$^2$.

Example 5

Synthesis of iso-Butyl-Trifunctional Phase (72)

10 g iso-butyltrimethoxysilane is dissolved in 100 mL decane in a 200-mL round bottom flask. Then 10 g of raw silica gel (5.0 μm; specific surface area, 300 m$^2$/g; mean pore size, 120 Å; pore volume, 1.0 mL/g) is dispersed in this solution. After reflux for 72 hours, the reaction mixture is filtered. The cake is then washed with sufficient quantity of heptane. The resulting material is dried in a vacuum oven at 60° C. for 12 hours. The elemental analysis provides a carbon content of 3.78%, which corresponds to a ligand density of 2.94 μmol/m$^2$.

This material was used for a comparison study between POSS bonded phase (43) and the material prepared by conventional silane chemistry (72).

Example 6

Synthesis of iso-Octyl-Trifunctional Phase (73)

10 g iso-Octyltrimethoxysilane is dissolved in 100 mL decane in a 200-mL round bottom flask. Then 10 g of raw silica gel (5.0 μm; specific surface area, 300 m$^2$/g; mean pore size, 120 Å; pore volume, 1.00 mL/g) is dispersed in this solution. After reflux for 72 hours, the reaction mixture is filtered. The cake is then washed with sufficient quantity of heptane. The resulting material is dried in a vacuum oven at 60° C. for 12 hours. The elemental analysis yields a carbon content of 6.33%, which corresponds to a ligand density of 2.52 μmol/m².

The making of this phase is for comparison study between POSS bonded phase (44) and the material prepared by conventional silane chemistry (73).

Example 7

Synthesis of $T_8$-POSS Phase (50)

5 g Aminopropylisobutyl POSS (10) is dissolved in 25 mL octane in a 100-mL round bottom flask. Then 5 g of isocyante bonded silica (30) based on the raw silica gel with the following physical specifications: particle size, 5.0 μm; specific surface area, 300 m²/g; mean pore size, 120 Å; pore volume, 1.0 mL/g, is dispersed in this solution. After reaction at 50° C. for 24 hours, the reaction mixture is filtered. The cake is then washed with sufficient quantity of THF. The resulting material is dried in a vacuum oven at 60° C. for 12 hours to give Phase 50.

Example 8

Synthesis of $T_8$-POSS Phase (55)

5 g Glycidyl POSS (15) is dissolved in 25 mL tetrahydrofuran (THF) in a 100-mL round bottom flask. Then 5 g of propylamino bonded silica (31) based on the raw silica gel with the following physical specifications: particle size, 5.0 μm; specific surface area, 300 m²/g; mean pore size, 120 Å; pore volume, 1.00 mL/g, is dispersed in this solution. After refluxing for 24 hours, the reaction mixture is filtered. The cake is then washed with sufficient quantity of heptane. The resulting material is dried in a vacuum oven at 60° C. for 12 hours to give Phase 55. Note that Phase 55 and the like can be used as precursors for further surface modifications.

Example 9

Synthesis of $T_8$-POSS Phase (57)

5 g Chlorobenzylisobutyl POSS (16) is dissolved in 25 mL THF in a 100-mL round bottom flask. Then 5 g of N,N-dimethylpropylamino bonded silica (32) based on the raw silica gel with the following physical specifications: particle size, 5.0 μm; specific surface area, 300 m²/g; mean pore size, 120 Å; pore volume, 1.0 mL/g, is dispersed in above solution. After reaction at ambient temperature for 12 hours, the reaction mixture is filtered. The cake is then washed with sufficient quantity of THF. The resulting material is dried in a vacuum oven at 60° C. for 12 hours to give Phase 57.

Example 10

Synthesis of $T_8$-POSS Phase (60)

5 g Mercaptopropylisobutyl POSS (23) is dissolved in 25 mL THF in a 100-mL round bottom flask. Then 2 g of methoxysodium and 5 g of 11-bromoundecane bonded silica (39) based on the raw silica gel with the following physical specifications: particle size, 5.0 μm; specific surface area, 200 m²/g; mean pore size, 200 Å; pore volume, 1.0 mL/g, is dispersed in above solution. After reaction at ambient temperature for 12 hours, the reaction mixture is filtered. The cake is then washed with sufficient quantity of THF, followed by D.I. water and acetone. The resulting material is dried in vacuum oven at 60° C. for 12 hours to give Phase 60.

Example 11

Synthesis of $T_8$-POSS Phase (66)

5 g Aminopropylphenyl POSS (12) is dissolved in 25 mL octane in a 100-mL round bottom flask. Then 5 g of propylsuccinic anhydride bonded silica (36) based on the raw silica gel with the following physical specifications: particle size, 5.0 μm; specific surface area, 300 m²/g; mean pore size, 120 Å; pore volume, 1.0 mL/g, is dispersed in above solution. After refluxing for 12 hours, the reaction mixture is filtered. The cake is then washed with sufficient quantity of heptane. The resulting material is dried in vacuum oven at 60° C. for 12 hours to give Phase 66.

Example 12

Synthesis of $T_8$-POSS Phase (67)

5 g Allylisobutyl POSS (21) is dissolved in 25 mL THF in a 100-mL round bottom flask. Then 5 g of hydride bonded silica (33) based on the raw silica gel with the following physical specifications: particle size, 5.0 μm; specific surface area, 300 m²/g; mean pore size, 120 Å; pore volume, 1.0 mL/g, is dispersed in this solution. After adding 0.1 g catalyst (e.g., chloroplatinic acid), the reaction is refluxing for 12 hours. Then the reaction mixture is filtered and the cake is washed with sufficient quantity of THF. The resulting material is dried in vacuum oven at 60° C. for 12 hours to give Phase 67.

Example 13

Synthesis of $T_8$-POSS Phase (69)

5 g Mercaptopropylisobutyl POSS (23) is dissolved in 25 mL THF in a 100-mL round bottom flask. Then 5 g long chain allyl bonded silica (37) based on the raw silica gel with the following physical specifications: particle size, 3.0 μm; specific surface area, 100 m²/g; mean pore size, 300 Å; pore volume, 1.0 mL/g, is dispersed in this solution. After adding 2 g initiator (e.g., AIBN), the reaction is maintained under reflux for 12 hours. Then the reaction mixture is filtered and the cake is washed with sufficient quantity of THF. The resulting material is dried in a vacuum oven at 60° C. for 12 hours to give Phase 69.

Example 14

Synthesis of $T_8$-POSS Phase (71)

5 g Octahydro POSS (9) is dissolved in 25 mL THF in a 100-mL round bottom flask. Then 5 g long chain allyl bonded silica (37) based on the raw silica gel with the following physical specifications: particle size, 3.0 μm; specific surface area, 100 m²/g; mean pore size, 300 Å; pore volume, 1.0 mL/g, is dispersed in this solution. After adding 0.1 g catalyst (e.g., chloroplatinic acid), the reaction is refluxing for 12 hours. Then the reaction mixture is filtered and the cake is washed with sufficient quantity of THF. The resulting material is dried in a vacuum oven at 60° C. for 12 hours to give Phase 71. Note that Phase 71 and the like can be used as precursors for further surface modifications.

Column Packing—General Procedure

After functionalization with the POSS compound, the resulting POSS bonded phase is packed into 3×50 mm stainless steel columns using traditional high-pressure slurry techniques for chromatography evaluation.

Example 15

Chromatography Evaluation
Hydrophobicity

FIG. 25 and FIG. 26 show the hydrophobicity comparison between the iso-butyl POSS phase (43) and the iso-butyl trifunctional phase (72), and between the iso-octyl POSS phase (44) and the iso-octyl trifunctional phase (73), respectively. The hydrophobic probe is pentylbenzene. Test conditions: column, 3×50-mm, 5-μm; mobile phase, acetonitrile/D.I. water (50:50 v/v); flow rate, 0.45 mL/min; injection volume, 1 μL; temperature, 25° C.; and detection, 254 nm. It is clear that the POSS bonded phases provide higher hydrophobic retention than corresponding trifunctional phases prepared by conventional silane reaction.

The chromatographic conditions are set forth below:
FIG. 25
Column: iso-butyl POSS, 5 μm (43)
  iso-butyl trifunctional, 5 μm (72)
Dimensions: 3.0×50 mm
Mobile Phase: MeCN/H$_2$O=50/50 (v/v)
Temperature: 25° C.
Flow Rate: 0.45 mL/min
Inj. Volume: 2 μL
Detection: UV (254 nm)
Sample: 0.5 mg/mL (each)
FIG. 26
Column: iso-octyl POSS, 5 μm (44)
  iso-octyl trifunctional, 5 μm (73)
Dimensions: 3.0×50 mm
Mobile Phase: MeCN/H$_2$O=50/50 (v/v)
Temperature: 25° C.
Flow Rate: 0.45 mL/min
Inj. Volume: 2 μL
Detection: UV (254 nm)
Sample: 0.5 mg/mL (each)

Example 16

Hydrophobic Selectivity

FIG. 27 and FIG. 28 show the hydrophobic selectivity comparison between the iso-butyl POSS phase (43) and the iso-butyl trifunctional phase (72), and between the iso-octyl POSS phase (44) and the iso-octyl trifunctional phase (73), respectively. The test probes are butylbenzene and pentylbenzene. The methylene selectivity (α) is defined as the retention (k') ratio of pentylbenzene to that of butylbenzene. Test conditions: column, 3×50-mm, 5-μm; mobile phase, acetonitrile/D.I. water (50:50 v/v); flow rate, 0.45 mL/min; injection volume, 14; temperature, 25° C.; and detection, 254 nm. It is clear that the POSS bonded phases provide higher hydrophobic selectivity than corresponding trifunctional phases prepared by conventional silane reaction.

The chromatographic conditions are set forth below:
FIG. 27
Column: iso-butyl POSS 5 μm (43)
  iso-butyl trifunctional, 5 μm (72)
Dimensions: 3.0×50 mm
Mobile Phase: MeCN/H$_2$O=50/50 (v/v)
Temperature: 25° C.
Flow Rate: 0.45 mL/min
Inj. Volume: 2 μL
Detection: UV (254 nm)
Sample: 0.5 mg/mL (each)
FIG. 28
Column: iso-octyl POSS, 5 μm (44)
  iso-octyl trifunctional, 5 μm (73)
Dimensions: 3.0×50 mm
Mobile Phase: MeCN/H$_2$O=50/50 (v/v)
Temperature: 25° C.
Flow Rate: 0.45 mL/min
Inj. Volume: 24
Detection: UV (254 nm)
Sample: 0.5 mg/mL (each)

Example 17

Shape Selectivity

Standard Reference Material (SRM) is a mixture of three polycyclic aromatic hydrocarbons (PAHs) in acetonitrile: benzo[a]pyrene (BaP), 1,2:3,4:5,6:7,8-tetrabenzonaphthalene (TBN, alternate name, dibenzo[g,p]chrysene), and phenanthro[3,4-c]phenanthrene (PhPh), and is used for characterizing the shape selectivity of a liquid chromatographic (LC) column for separation of PAHs. The shape selectivity (α) is defined as the retention (k') ratio of TBN to that of BaP. FIG. 29 and FIG. 30 show the shape selectivity comparison between the iso-butyl POSS phase (43) and the iso-butyl trifunctional phase (72), and between the iso-octyl POSS phase (44) and the iso-octyl trifunctional phase (73), respectively. The test probes are BaP and TBN. Test conditions: column, 3×50-mm, 5-μm; mobile phase, methanol/D.I. water (80:20 v/v); flow rate, 0.45 mL/min; injection volume, 2 μL; temperature, 25° C.; and detection, 254 nm. It is clear that POSS bonded phases have different shape selectivity than corresponding trifunctional phases prepared by conventional silane reaction.

Chromatographic conditions are shown below:
FIG. 29
Column: iso-butyl POSS, 5 μm (43)
  iso-butyl trifunctional, 5 μm (72)
Dimensions: 3.0×50 mm
Mobile Phase: MeOH/H$_2$O=80/20 (v/v)
Temperature: 25° C.
Flow Rate: 0.45 mL/min
Inj. Volume: 2 μL
Detection: UV (254 nm)
Sample: 0.5 mg/mL (each)
FIG. 30
Column: iso-octyl POSS 5 μm (44)
  iso-octyl trifunctional, 5 μm (73)
Dimensions: 3.0×50 mm
Mobile Phase: MeOH/H$_2$O=80/20 (v/v)
Temperature: 25° C.
Flow Rate: 0.45 mL/min
Inj. Volume: 2 μL
Detection: UV (254 nm)
Sample: 0.5 mg/mL (each)

Example 18

Hydrolytic Stability

Hydrolytic stability is an important parameter to assess the quality of a stationary phase. The test probes is a neutral hydrophobic probe—phenanthrene. The hydrolytic stability is measured by remaining retention (k') of phenanthrene after exposing the column to an acidic condition (0.2% triflouroacetic acid) and at elevated temperature (50° C.) for a period of time (50 hours). The test protocol consists of three steps: initial testing, aging, and final testing. The hydrolytic stability is measured as the percentage of remaining retention. Condition for initial and final testing: column, 3×50-mm, 5-μm; mobile phase, acetonitrile/D.I. water (40:60 v/v); flow rate, 0.45 mL/min; injection volume, 2 μL; temperature, 30° C.; and detection, 254 nm. The aging protocol: purge the column with 0.2% triflouroacetic acid (aq.) at 0.45 mL/min and at 50° C. for 120 min. Then wash the column with 95% methanol at 0.45 mL/min for 20 min. Repeat above cycle for 25 times. FIG. 31 and FIG. 32 show the hydrolytic stability comparison between the iso-butyl POSS phase (43) and the iso-butyl trifunctional phase (72), and between the iso-octyl POSS phase (44) and the iso-octyl trifunctional phase (73), respectively. It is clear that both POSS bonded phases provide better hydrolytic stability than corresponding trifunctional phases prepared by conventional silane chemistry.

Figure 33:
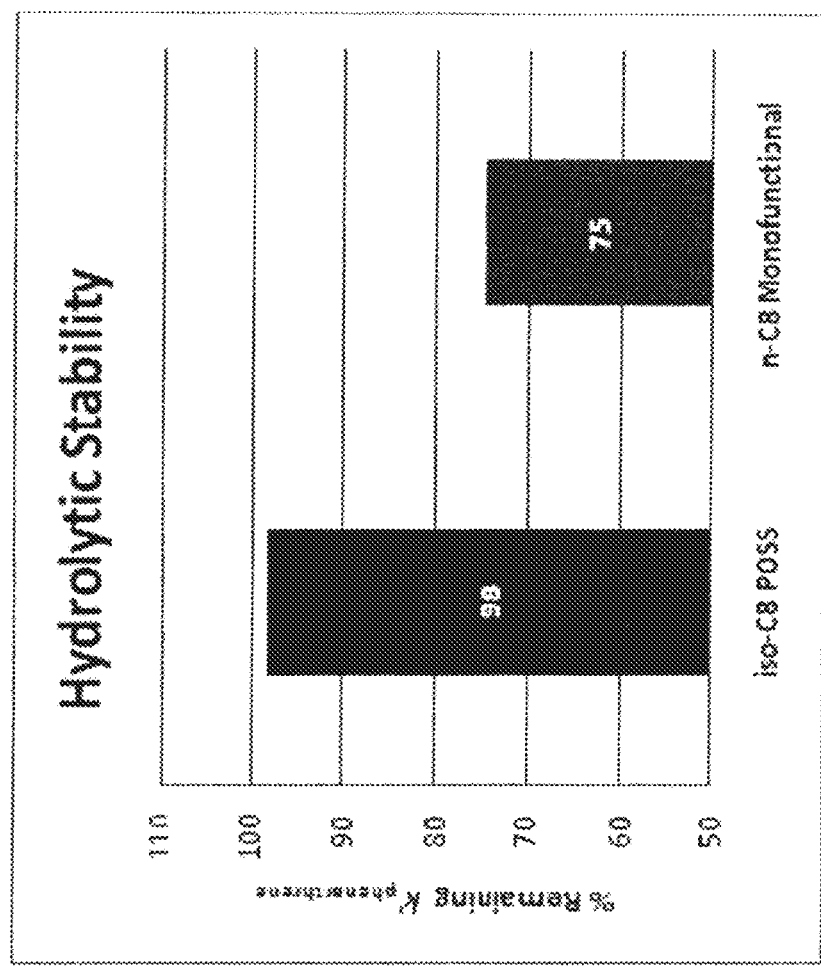
FIG. 33 shows the hydrolytic stability comparison between the iso-octyl POSS phase (44) and the n-octyl monofunctional phase (73), respectively. Both phases have similar carbon contents (9%) and are based on the same batch of raw silica gel. It is clear that both POSS bonded phases provide better hydrolytic stability than the monofunctional C8 phase prepared by conventional silane chemistry.

FIG. 33 shows the hydrolytic stability comparison between the iso-octyl POSS phase (44) and the n-octyl monofunctional phase (73), respectively. Both phases have similar carbon contents (9%) and are based on the same batch of raw silica gel. It is clear that both POSS bonded phases provide better hydrolytic stability than the monofunctional $C_8$ phase prepared by conventional silane chemistry.

Chromatographic conditions are set forth below:
FIG. 31
Column: iso-butyl POSS, 5 μm (43)
  iso-butyl trifunctional 5 μm (72)
Dimensions: 3.0×50 mm
Mobile Phase: MeCN/$H_2O$=40/60 (v/v)
Temperature: 30° C.
Flow Rate: 0.45 mL/min
Inj. Volume: 2 μL
Detection: UV (254 nm)
Sample: 0.2 mg/mL
FIG. 32
Column: iso-octyl POSS, 5 μm (44)
  iso-octyl trifunctional, 5 μm (73)
  n-octyl monofunctional, 5 μm (73)
Dimensions: 3.0×50 mm
Mobile Phase: MeCN/$H_2O$=40/60 (v/v)
Temperature: 30° C.
Flow Rate: 0.45 mL/min
Inj. Volume: 2 μL
Detection: UV (254 nm)
Sample: 0.2 mg/mL
Probe: phenanthrene
FIG. 33
Column: iso-octyl POSS, 5 μm (44)
  n-octyl monofunctional, 5 μm
Dimensions: 3.0×50 mm
Mobile Phase: MeCN/$H_2O$=40/60 (v/v)
Temperature: 30° C.
Flow Rate: 0.45 mL/min
Inj. Volume: 2 μL
Detection: UV (254 nm)
Sample: 0.2 mg/mL
Probe: phenanthrene

What is claimed is:

1. A method of separating analytes in a liquid sample, the method comprising:
flowing the liquid sample through a chromatography column configured for use in liquid chromatography, the liquid sample comprises at least one aromatic compound and an aqueous mobile phase, the chromatography column containing therein a composition, the composition comprising:
a solid support having an exterior surface;
a ligand comprising a polyhedral oligomeric silsesquioxane moiety;
a linker covalently bound to both the polyhedral oligomeric silsesquioxane moiety and the exterior surface of the solid support, wherein the polyhedral oligomeric silsesquioxane moiety is grafted to the solid support through only a single locus, wherein the linker is interposed between the polyhedral oligomeric silsesquioxane moiety and the solid support, wherein the linker is in the form L1-X-L2 where L1 and L2 are members selected from substituted or unsubstituted alkyl, substituted or unsubstituted heteroalkyl, substituted or unsubstituted aryl, and substituted or unsubstituted heteroaryl moieties linked through covalent bonding through X, where X is a linkage fragment selected from the group consisting of RNC(O)NR', OCH(OH)CH2NH, HNC(O)CH (CH2)CH2COOH, SC(O)NH, HNC(O)S, SC(O)O, NHC(O), (O)CNH, NHC(O)O, OC(O)NH, (CH2) oO, and (CH2)oYx PEG wherein Yx is S, NHC(O), C(O)NH, NHC(O)O, and OC(O)NH, where o is an integer from 1 to 50, where R and R' each independently refer to substituted or unsubstituted alkyl, substituted or unsubstituted heteroalkyl, substituted or unsubstituted aryl, substituted or unsubstituted heteroaryl, and substituted or unsubstituted heterocycloalkyl groups.

2. The method of claim 1, wherein the linker comprises at least 4 carbon atoms in sequence.

3. The method of claim 1, wherein the linker comprises at least 8 carbon atoms in sequence.

4. The method of claim 1, wherein the linker comprises at least 10 carbon atoms in sequence.

5. The method of claim 1, wherein the solid support is in particulate form, and wherein multiple support particles are disposed in a packed bed.

6. The method of claim 1, wherein the solid support comprises a member selected from silica, alumina, titania, zirconia, and combinations thereof.

7. The method of claim 1, wherein the solid support comprises silica gel.

8. The method of claim 1, wherein the solid support further comprises a plurality of pores each of which defines an interior space and the ligand is covalently bound to both the exterior surface and the interior space.

9. The method of claim 3, wherein at least two of the least 8 carbon atoms in sequence are part of a ring selected from substituted or unsubstituted aryl, substituted or unsubstituted heteroaryl and substituted or unsubstituted cycloalkyl.

10. The method of claim 1, wherein the linker includes an ion exchange moiety.

11. The method of claim 1, wherein one or more silicon atom of the polyhedral oligomeric silsesquioxane is independently bonded to an R group selected from H, OH, unsubstituted alkyl, substituted or unsubstituted aryl, substituted or unsubstituted heteroaryl, and substituted or unsubstituted heterocycloalkyl.

12. The method of claim 1, wherein one or more silicon atom of the polyhedral oligomeric silsesquioxane is independently bonded to an R group selected from alkyl or aryl carboxylic acid, alkyl or aryl sulfonate, alkyl or aryl imide, alkyl or aryl thiol, alkyl or aryl epoxide, fluoroalkyl, and poly(ethylene glycol).

13. The method of claim 1, wherein one or more silicon atom of the polyhedral oligomeric silsesquioxane is bonded to an R group independently selected from H, ethyl, i-butyl, i-octyl, cyclohexyl, cyclopentyl, phenyl, propylamino, glycidyl, propylmethacrylate, and vinyl.

14. A method of separating analytes in a liquid sample, the method comprising:
    flowing the liquid sample through a chromatography column configured for use in liquid chromatography, the liquid sample comprises at least one aromatic compound and an aqueous mobile phase, the chromatography column containing therein a composition, the composition comprising:
    a solid support having an exterior surface;
    a ligand comprising a polyhedral oligomeric silsesquioxane moiety;
    a linker covalently bound to both the polyhedral oligomeric silsesquioxane moiety and the exterior surface of the solid support, wherein the polyhedral oligomeric silsesquioxane moiety is grafted to the solid support through only a single locus, wherein the linker is interposed between the polyhedral oligomeric silsesquioxane moiety and the solid support,
    wherein the combined structure is in the form of SS-L1-Z-L2-POSS where SS is the solid support, POSS is the polyhedral oligomeric silsesquioxane moiety, L1 and L2 are members selected from substituted or unsubstituted alkyl, substituted or unsubstituted heteroalkyl, substituted or unsubstituted aryl and substituted or unsubstituted heteroaryl moieties linked through covalent bonding through Z, where Z is selected from the group consisting of OCH(OH)CH2NH, HNC(O)CH(CH2)CH2COOH, and SCH2CH2CH2O.

15. The method of claim 14 wherein L1 and L2 are selected from unsubstituted alkyl, unsubstituted heteroalkyl, unsubstituted heteroaryl, and unsubstituted aryl moieties.

16. The method of claim 15 wherein L1 and L2 are selected from unsubstituted alkyl and unsubstituted aryl moieties.

17. The method of claim 14 wherein Z includes OCH(OH)CH2NH.

18. The method of claim 14 wherein Z includes HNC(O)CH(CH2)CH2COOH.

19. The method of claim 14 wherein Z includes SCH2CH2CH2O.

20. A method of separating analytes in a liquid sample, the method comprising:
    flowing the liquid sample through a chromatography column configured for use in liquid chromatography, the liquid sample comprises at least one aromatic compound and an aqueous mobile phase, the chromatography column containing therein a composition, the composition comprising:
    a solid support having an exterior surface;
    a ligand comprising a polyhedral oligomeric silsesquioxane moiety;
    a linker covalently bound to both the polyhedral oligomeric silsesquioxane moiety and the exterior surface of the solid support, wherein the polyhedral oligomeric silsesquioxane moiety is grafted to the solid support through only a single locus, wherein the linker is interposed between the polyhedral oligomeric silsesquioxane moiety and the solid support,
    wherein the combined structure is in the form of SS-L1-Z-L2-POSS where SS is the solid support, POSS is the polyhedral oligomeric silsesquioxane moiety, L1 and L2 are members selected from substituted or unsubstituted alkyl, substituted or unsubstituted heteroalkyl, substituted or unsubstituted aryl and substituted or unsubstituted heteroaryl moieties linked through covalent bonding through Z, where Z includes N+(CH3)(CH3).

* * * * *

UNITED STATES PATENT AND TRADEMARK OFFICE
CERTIFICATE OF CORRECTION

PATENT NO. : 11,740,163 B2
APPLICATION NO. : 16/160925
DATED : August 29, 2023
INVENTOR(S) : Xiaodong Liu et al.

It is certified that error appears in the above-identified patent and that said Letters Patent is hereby corrected as shown below:

On the Title Page

In Column 1, item (60) delete "(60)" and insert -- (63) --, therefor.

Signed and Sealed this
Tenth Day of October, 2023

Katherine Kelly Vidal
*Director of the United States Patent and Trademark Office*